United States Patent
Story

(10) Patent No.: US 10,748,332 B2
(45) Date of Patent: Aug. 18, 2020

(54) HYBRID FRUSTUM TRACED SHADOWS SYSTEMS AND METHODS

(71) Applicant: NVIDIA Corporation, Santa Clara, CA (US)

(72) Inventor: Jon Story, Grafrath (DE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/922,842

(22) Filed: Mar. 15, 2018

(65) Prior Publication Data

US 2018/0268604 A1 Sep. 20, 2018

Related U.S. Application Data

(60) Provisional application No. 62/471,878, filed on Mar. 15, 2017.

(51) Int. Cl.
| | |
|---|---|
| *G06T 15/60* | (2006.01) |
| *G06T 3/40* | (2006.01) |
| *G06T 7/507* | (2017.01) |
| *G06T 5/00* | (2006.01) |
| *G06T 15/00* | (2011.01) |
| G06T 15/80 | (2011.01) |

(52) U.S. Cl.
CPC ............ *G06T 15/60* (2013.01); *G06T 3/4007* (2013.01); *G06T 5/008* (2013.01); *G06T 7/507* (2017.01); *G06T 15/005* (2013.01); *G06T 15/80* (2013.01)

(58) Field of Classification Search
None
See application file for complete search history.

(56) References Cited

U.S. PATENT DOCUMENTS

| | | |
|---|---|---|
| 8,542,247 B1 | 9/2013 | Hakura et al. |
| 8,564,616 B1 | 10/2013 | Hakura et al. |
| 9,626,792 B2 | 4/2017 | Svakhin |

(Continued)

OTHER PUBLICATIONS

Assarsson, Ulf, and Tomas Akenine-Möller. "A geometry-based soft shadow volume algorithm using graphics hardware." ACM Transactions on Graphics (TOG). vol. 22. No. 3. ACM, 2003 (Year: 2003).*

(Continued)

*Primary Examiner* — Diane M Wills
(74) *Attorney, Agent, or Firm* — Shook, Hardy & Bacon, L.L.P.

(57) ABSTRACT

Systems and methods that facilitate efficient and effective shadow image generation are presented. In one embodiment, a hard shadow generation system comprises a compute shader, pixel shader and graphics shader. The compute shader is configured to retrieve pixel depth information and generate projection matrix information, wherein the generating includes performing dynamic re-projection from eye-space to light space utilizing the pixel depth information. The pixel shader is configured to create light space visibility information. The graphics shader is configured to perform frustum trace operations to produce hard shadow information, wherein the frustum trace operations utilize the light space visibility information. The light space visibility information can be considered irregular z information stored in an irregular z-buffer.

21 Claims, 26 Drawing Sheets

(56) References Cited

U.S. PATENT DOCUMENTS 9,824,412 B2     11/2017     Sharma et al.

OTHER PUBLICATIONS

Fernando, "Percentage-closer soft shadows", in Proc. ACM SIGGRAPH Sketches, 2005 (Year: 2005).*

Wyman, Chris, Rama Hoetzlein, and Aaron Lefohn. "Frustum-traced raster shadows: Revisiting irregular z-buffers." Proceedings of the 19th Symposium on Interactive 3D Graphics and Games. ACM, 2015 (Year: 2015).*

Zachrisson, Mikael, "High Quality Shadows for Real-time Surface Visualization", Linkopings Universitet, Oct. 24, 2016 (Year: 2016).*

Johnson, Gregory S., William R. Mark, and Christopher A. Burns. The irregular z-buffer and its application to shadow mapping. Computer Science Department, University of Texas at Austin, 2004 (Year: 2004).*

Wyman, Chris, Rama Hoetzlein, and Aaron Lefohn. "Frustum-traced raster shadows: Revisiting irregular z-buffers." In Proceedings of the 19th Symposium on Interactive 3D Graphics and Games, pp. 15-23. ACM, 2015.

Story, Jon. "Hybrid ray traced shadows." In Game Developer Conference. 2015.

Lecocq, Pascal, Jean-Eudes Marvie, Gael Sourimant, and Pascal Gautron. "Sub-pixel shadow mapping." In Proceedings of the 18th meeting of the ACM SIGGRAPH Symposium on Interactive 3D Graphics and Games, pp. 103-110. ACM, 2014.

Voica, Alex, "Implementing fast, ray traced soft shadows in a game engine", Jul. 21, 2015. https://www.imgtec.com/blog/implementing-fast-ray-traced-soft-shadows-in-a-game-engine/.

Fernando, Randima. "Percentage-closer soft shadows." In SIGGRAPH Sketches, p. 35. 2005.

Hasselgren, Jon, Tomas Akenine-Möller, and Lennart Ohlsson. "Conservative rasterization." GPU Gems 2 (2005): 677-690.

Gruen, Holger, "Contact Hardening Shadows 11", AMD Graphics Product Group, 2006.

* cited by examiner

| Light Space Cell | Pixels | | | |
|---|---|---|---|---|
| 511 | | | | |
| 512 | | | | |
| 513 | | | | |
| 514 | P2 | | | |
| 515 | P3 | | | |
| 516 | | | | |
| 517 | | | | |
| 521 | | | | |
| 522 | P7 | | | |
| 523 | P9 | | | |
| 524 | | | | |
| 525 | P2 | P3 | P7 | P8 |
| 526 | P2 | P3 | P7 | P9 |
| 527 | | | | |
| 531 | P7 | | | |
| 532 | P7 | | | |
| 533 | | | | |
| 534 | | | | |
| 535 | | | | |
| 536 | P2 | P3 | P7 | P8 |
| 537 | P11 | P12 | | |
| 541 | | | | |
| 542 | P12 | P17 | | |
| 543 | P12 | P15 | | |
| 544 | P13 | P4 | | |
| 545 | | | | |
| 546 | P2 | P3 | P7 | P15 |
| 547 | | | | |

| Light Space Cell | Pixels | | | |
|---|---|---|---|---|
| 551 | | | | |
| 552 | P17 | P20 | P21 | P22 |
| 553 | P21 | P23 | P24 | P25 |
| 554 | P21 | P23 | P24 | P25 |
| 555 | P21 | P23 | P24 | P25 |
| 556 | P21 | P23 | P24 | P25 |
| 557 | | | | |
| 561 | | | | |
| 562 | P17 | P20 | P21 | P22 |
| 563 | P21 | P23 | P24 | P25 |
| 564 | P21 | P23 | P24 | P25 |
| 565 | P21 | P23 | P24 | P25 |
| 566 | P21 | P23 | P24 | P25 |
| 567 | | | | |
| 571 | | | | |
| 572 | P17 | P21 | | |
| 573 | P17 | P21 | | |
| 574 | P21 | P23 | P24 | P25 |
| 575 | P21 | P23 | P24 | P25 |
| 576 | | | | |
| 577 | | | | |
| 581 | | | | |
| 582 | | | | |
| 583 | P2 | P3 | P7 | |
| 584 | | | | |
| 585 | | | | |
| 586 | P2 | P3 | P7 | |
| 587 | | | | |

FIG 5A

| 511 | 512 | 513 | 514<br>P2 | 515<br>P3 | 516 | 517 |
|---|---|---|---|---|---|---|
| 521 | 522<br>P7 | 523<br>P9 | 524 | 525<br>P2, P3, P7,<br>P8 | 526<br>P2, P3, P7,<br>P9 | 527 |
| 531<br>P7 | 532<br>P7 | 533 | 534 | 535 | 536<br>P2, P3, P7,<br>P8 | 537<br>P11, P12 |
| 541 | 542<br>P12, P17 | 543<br>P12, P15 | 544<br>P13, P4 | 545 | 546<br>P2, P3, P7,<br>P15 | 547 |
| 551 | 552<br>P17, P20,<br>P21, P22 | 553<br>P21, P23,<br>P24, P25 | 554<br>P21, P23,<br>P24, P25 | 555<br>P21, P23,<br>P24, P25 | 556<br>P21, P23,<br>P24, P25 | 557 |
| 561<br>P20 | 562<br>P17, P20,<br>P21, P22 | 563<br>P21, P23,<br>P24, P25 | 564<br>P21, P23,<br>P24, P25 | 565<br>P21, P23,<br>P24, P25 | 566<br>P21, P23,<br>P24, P25 | 567 |
| 571 | 572<br>P17, P21 | 573<br>P17, P21 | 574<br>P21, P23,<br>P24, P25 | 575<br>P21, P23,<br>P24, P25 | 576 | 577 |
| 581 | 582 | 583<br>P2, P3, P7 | 584 | 585 | 586<br>P2, P3, P7 | 587 |

| Light Space Cell | Pixels | | | |
|---|---|---|---|---|
| 1511 | | | | |
| 1512 | | | | |
| 1513 | | | | |
| 1514 | | | | |
| 1515 | | | | |
| 1516 | | | | |
| 1517 | | | | |
| 1521 | | | | |
| 1522 | | | | |
| 1523 | | | | |
| 1524 | P23 | | | |
| 1525 | | | | |
| 1526 | | | | |
| 1527 | | | | |
| 1531 | | | | |
| 1532 | P17 | | | |
| 1533 | P21 | | | |
| 1534 | P23 | P24 | | |
| 1535 | P24 | P25 | | |
| 1536 | | | | |
| 1537 | | | | |
| 1541 | | | | |
| 1542 | P20 | P21 | | |
| 1543 | P20 | P21 | | |
| 1544 | P24 | P25 | | |
| 1545 | P24 | P25 | | |
| 1546 | P21 | P23 | | |
| 1547 | | | | |

| Light Space Cell | Pixels | | | |
|---|---|---|---|---|
| 1551 | | | | |
| 1552 | P22 | | | |
| 1553 | P21 | P22 | P24 | |
| 1554 | P23 | P24 | P25 | |
| 1555 | P23 | P25 | | |
| 1556 | P24 | P25 | | |
| 1557 | | | | |
| 1561 | | | | |
| 1562 | P21 | | | |
| 1563 | | | | |
| 1564 | P21 | P23 | P24 | |
| 1565 | P23 | P24 | P24 | |
| 1566 | P24 | P25 | | |
| 1567 | | | | |
| 1571 | | | | |
| 1572 | P17 | | | |
| 1573 | | | | |
| 1574 | P24 | P25 | | |
| 1575 | | | | |
| 1576 | | | | |
| 1577 | | | | |
| 1581 | | | | |
| 1582 | | | | |
| 1583 | | | | |
| 1584 | | | | |
| 1585 | | | | |
| 1586 | | | | |
| 1587 | | | | |

FIG 5C

| 1511 | 1512 | 1513 | 1514 | 1515 | 1516 | 1517 |
|---|---|---|---|---|---|---|
| 1521 | 1522 | 1523 | 1524<br>P23, | 1525 | 1526 | 1527 |
| 1531 | 1532<br>P17 | 1533<br>P21 | 1534<br>P23, P24 | 1535<br>P24, P25 | 1536 | 1537 |
| 1541 | 1542<br>P20, P21 | 1543<br>P20, P21 | 1544<br>P24, P25 | 1545<br>P24, P25 | 1546<br>P21, P23 | 1547 |
| 1551 | 1552<br>P22 | 1553<br>P21, P22,<br>P24 | 1554<br>P23, P24,<br>P25 | 1555<br>P23, P25 | 1556<br>P24, P25 | 1557 |
| 1561 | 1562<br>P21 | 1563 | 1564<br>P21, P23,<br>P24 | 1565<br>P23, P24,<br>P25 | 1566<br>P24, P25 | 1567 |
| 1571 | 1572<br>P17 | 1573 | 1574<br>P24, P25 | 1575 | 1576 | 1577 |
| 1581 | 1582 | 1583 | 1584 | 1585 | 1586 | 1587 |

FIG. 5D

| Light Space Cell | Pixel | | | |
|---|---|---|---|---|
| 511 | | | | |
| 512 | | | | |
| 513 | | | | |
| 514 | P2 | | | |
| 515 | P3 | | | |
| 516 | | | | |
| 517 | | | | |
| 521 | | | | |
| 522 | P7 | | | |
| 523 | P9 | | | |
| 524 | | | | |
| 525 | P2 | P3 | P7 | P8 |
| 526 | P2 | P3 | P7 | P9 |
| 527 | | | | |
| 531 | P7 | | | |
| 532 | P7 | | | |
| 533 | | | | |
| 534 | | | | |
| 535 | | | | |
| 536 | P2 | P3 | P7 | P8 |
| 537 | P11 | P12 | | |
| 541 | | | | |
| 542 | P12 | P17 | | |
| 543 | P12 | P15 | | |
| 544 | P13 | P4 | | |
| 545 | | | | |
| 546 | P2 | P3 | P7 | P15 |
| 547 | | | | |
| 551 | | | | |
| 557 | | | | |
| 561 | | | | |
| 567 | | | | |
| 571 | | | | |
| 576 | | | | |
| 577 | | | | |
| 581 | | | | |
| 582 | | | | |
| 583 | P2 | P3 | P7 | |
| 584 | | | | |
| 585 | | | | |
| 586 | P2 | P3 | P7 | |
| 587 | | | | |

FIG 5E

| Light Space Cell | Pixels | | | |
|---|---|---|---|---|
| 1524 | P23 | | | |
| 1532 | P17 | | | |
| 1533 | P21 | | | |
| 1534 | P23 | P24 | | |
| 1535 | P24 | P25 | | |
| 1542 | P20 | P21 | | |
| 1543 | P20 | P21 | | |
| 1544 | P24 | P25 | | |
| 1545 | P24 | P25 | | |
| 1546 | P21 | P23 | | |
| 1555 | P23 | P25 | | |
| 1556 | P24 | P25 | | |
| 1562 | P21 | | | |
| 1564 | P21 | P23 | P24 | |
| 1565 | P23 | P24 | P24 | |
| 1566 | P24 | P25 | | |
| 1572 | P17 | | | |
| 1574 | P24 | P25 | | |

FIG 5G

| Light Space Cell | Pixel | | | |
|---|---|---|---|---|
| 514 | P2 | | | |
| 515 | P3 | | | |
| 522 | P7 | | | |
| 523 | P9 | | | |
| 525 | P2 | P3 | P7 | P8 |
| 526 | P2 | P3 | P7 | P9 |
| 531 | P7 | | | |
| 532 | P7 | | | |
| 536 | P2 | P3 | P7 | P8 |
| 537 | P11 | P12 | | |
| 542 | P12 | P17 | | |
| 543 | P12 | P15 | | |
| 544 | P13 | P4 | | |
| 546 | P2 | P3 | P7 | P15 |
| 583 | P2 | P3 | P7 | |
| 586 | P2 | P3 | P7 | |

FIG 5H

HYBRID FRUSTUM TRACED SHADOWS SYSTEMS AND METHODS

CROSS-REFERENCE TO RELATED APPLICATIONS

This application claims benefit of and priority to U.S. Provisional Patent Application No. 62/471,878, filed Mar. 15, 2017, which is incorporated herein by reference in its entirety.

FIELD OF THE INVENTION

The present invention relates to generating shadows in a graphically rendered image.

BACKGROUND

Numerous electronic technologies such as digital computers, video equipment, and telephone systems have facilitated increased productivity and reduced costs in processing information in most areas of business, science, and entertainment. The electronic systems often utilize a number of methods to convey information including audio, video, graphics, and so on. Accurate and clear graphics images are typically important for proper conveyance of information and user experience. There are a number of factors that can impact accurate graphics images, including shadow presentation. However, traditional approaches to shadow rendering can be inadequate and difficult and complex to achieve adequate shadow effects.

Attempts at utilizing conventional shadow mapping techniques often encounter a number of issues in attempting to generate shadows that accurately simulate real world behavior. For example, in the real world, a shadow's penumbra is generally sharper/crisper at the point of contact with the object that casts it, but gradually becomes softer as the distance from the originating object increases. Unfortunately, efficiently reproducing this transition is difficult for conventional rendering techniques. Traditional shadow mapping is performed by blurring the entire penumbra of a shadow mapped to an object. While computationally efficient, and sufficient for creating soft shadows, traditional shadow mapping suffers from poor performance when creating the sharper shadows closer to the originating object ("blocker"). Shadow rendering using ray tracing is a newer approach that performs well for both soft and hard shadows, but currently implemented techniques are computationally complex and require significant hardware resources to perform, which often make them impractical for many applications. The issues can be particularly problematic in traditional variable penumbra techniques (e.g., such as PCSS, CHS, etc.). The traditional problems can include aliasing as the depth (distance) from the blocker object approaches zero, insufficient shadow map resolution for small or tiny geometry details, detachment of shadows from casting objects (e.g., caused by z biasing avoidance of shadow acne), penumbra estimation for overlapping blocker of large differences, and so on.

SUMMARY

Systems and methods that facilitate efficient and effective shadow image generation are presented. In one embodiment, a hybrid frustum trace shadow approach is provided that includes a dynamic re-projection shadow mapping (DRSM) process in conjunction with a frustum trace light space visibility buffer approach to generate a hard shadow. In one embodiment, the light space visibility buffer can be a an irregular Z buffer In one exemplary implementation, the hard shadow can then be interpolated to generate a soft shadow. In one embodiment, the dynamic re-projection shadow map process includes two computer shader passes before frustum trace operations are performed. The first process pass can include a screen space pass which performs a quantized count of screen pixels mapped to a light pixel or texel. In one embodiment, the light first pass quantized count can be based upon an original cascade set up. The results of the quantized count can be included in a list. The second process pass can include a light space pass that identifies areas with particular characteristics (e.g., non-zero list length, high list length, list length that exceeds a threshold, etc.). The particular characteristics can be based upon a user devined tolerance. The identified areas are subsequently turned into new light space frusta. Matrices associated with the new light space frusta can be stored in a GPU side buffer along with the number of new re-projections.

In one embodiment, during a frustum tracing pass a graphics shader un-projects the incoming SV_POSITION, and produced multiple primitives which are re-projected based upon matrices associated with the new light space frusta. The re-projection can also be based upon information stored in a GPU side buffer. In one exemplary implementation, this has the effect of removing most redundant light space. Since the new re-projections are subsets of the original, long lists are spread over a wide area when they are mapped to the same resolution light space, which can dramatically improve the occupancy of the machine.

Unlike SDSM techniques, in one embodiment, the hybrid frustum trace shadow process does not require a CPU read back. The originally supplied light space can be used by the frustum and occlusion culling systems, which makes for very easy integration with existing game technology.

In one embodiment, efficient shadow blocker distance accommodation operations are performed. In one exemplary implementation, a hybrid frustum traced shadow image rendering process includes a mechanism to account for effects or impacts on a shadow associated with the distance between a shadow blocker object and a shadow receive object. In one embodiment, a hybrid frustum traced shadow image rendering process approximates the eye view space position of a primitive in the graphics shader. A delta between the approximate triangle position and a screen position being tested is computed in the pixel shader, and an interlocked Min is performed to store out the minimum blocker distance to a full screen buffer. In one exemplary implementation, the In general this approximation proves good enough.

In one embodiment, a shadow generation system comprises a compute shader, pixel shader and graphics shader. The compute shader is configured to retrieve pixel depth information and generate projection matrix information, wherein the generating includes performing dynamic re-projection from eye-space to light space utilizing the pixel depth information. The pixel shader is configured to create light space visibility information. The graphics shader is configured to perform frustum trace operations to produce hard shadow information, wherein the frustum trace operations utilize the light space visibility information. The light space visibility information can be considered irregular z information stored in an irregular z-buffer.

In one embodiment, the dynamic re-projection includes creating multiple projection matrices based upon the density of pixel projections in an area of a light space grid. A first projection matrix can be a subset of a portion of initial projection information, wherein the subset corresponds to a portion of a light space grid where a density of pixel projections exceed a threshold. In one embodiment, the light space visibility information may include list head information. Performing frustum trace operations can include determining if a pixel is within a frustum. In one exemplary implementation the frustum trace operations include: defining a frustum projected from a grid cell corresponding to a light source in light space; determining that a graphics primitive intersects the frustum; and accessing a light space visibility buffer to obtain a set of pixel fragment footprints corresponding to the frustum and identifying whether a pixel fragment footprint within the set is shadowed by the graphics primitive.

In one embodiment, a dynamic re-projection method comprises: generating an initial projection list; determining a subset of light space grid cells in which the initial list indicates the number of pixels mapped to the subset of light space grid cells exceed a threshold; and performing dynamic re-projection of pixels corresponding to the subset of light space grid cells. In one exemplary implementation, the pixels in the sub set of pixels are spread out during the re-projection to a light space grid with the same number of light space grid cells as an initial light space grid. The dynamic re-projection method can include generating a plurality of matrices based upon the dynamic re-projection. The dynamic re-projection can also include generating a plurality of matrices based upon the dynamic re-projection. The plurality of matrices can include a first matrix corresponding to a projection of the original set of pixels minus the subset of pixels and a second matrix corresponding to the dynamic re-projection of the subset of pixels. The subset of pixels can correspond to a "hot" area in terms of the number of pixels mapping to an area of a light space grid. In one exemplary implementation, the number of pixels projected to a light space grid is quadratically reduced, which in turn reduces a length of a list corresponding to a projection of the pixels. The dynamic re-projection method can include creating a projection matrix buffer that stores multiple projection matrices associated with the dynamic re-projection.

In one embodiment, a system comprises: a processor configured to perform operations including hybrid frustum trace shadow operations to generate a shadow effect, wherein the hybrid frustum trace shadow operations include dynamic re-projection operations and frustum tracing; a memory configured to store information for the processor, including information associated hybrid frustum trace shadow operations; and a display configured to present shadows in accordance with the shadow effect. In one exemplary implementation, the processor render anti-aliased hard shadows in a real-time using a light space visibility buffer generated utilizing the dynamic re-projection results. In one embodiment, the processor avoids introduction of spatial and temporal aliasing. A linear interpolation (lerp) factor can be applied to the frustum tracing generation of hard shadow information.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 5A is an exemplary listing of an initial projection list in accordance with one embodiment.

FIG. 5B is a visual representation of the initial projection list with light space cells, in which light space grid cells that map to greater numbers of pixels projections are shown in darker shades of grey in accordance with one embodiment.

FIG. 5C is an exemplary listing of an exemplary re-projection list in accordance with one embodiment.

FIG. 5D is a visual representation of the re-projection list with light space cells from the bounding area of the initial projection list, in which light space grid cells that map to greater numbers of pixels projections are shown in darker shades of grey in accordance with one embodiment.

FIG. 5E is an exemplary listing of an original projection list minus the hot spot bounding area in accordance with one embodiment.

FIG. 5G is a reduction of the list in FIG. 5C in accordance with one embodiment.

FIG. 5H is a reduction of the list in FIG. 5E in accordance with one embodiment.

DETAILED DESCRIPTION

Figure 1:
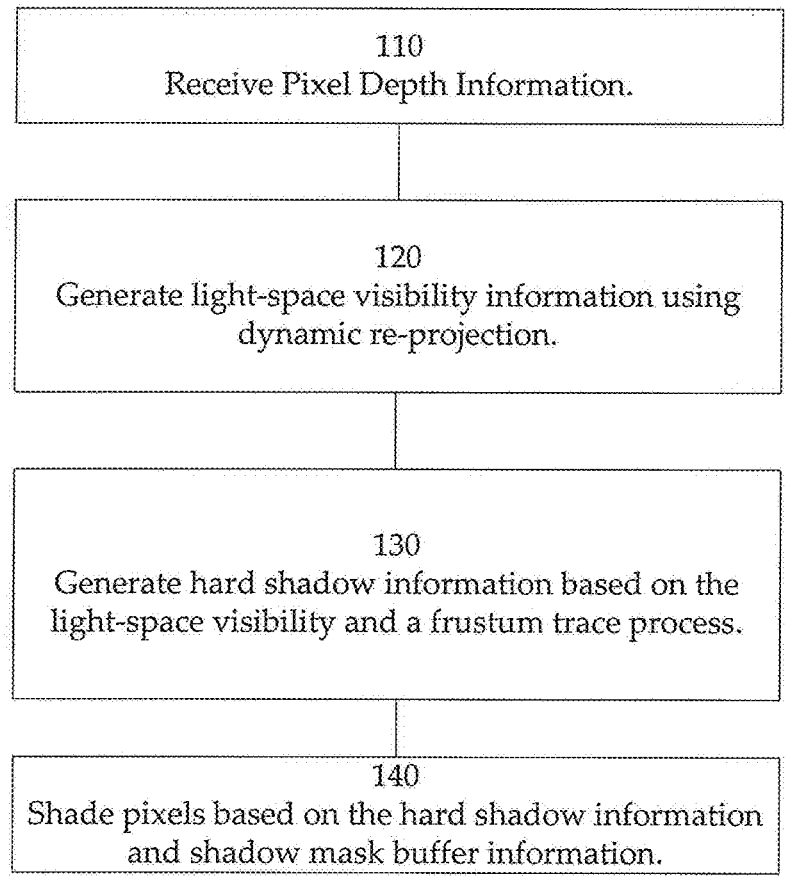
FIG. 1 is a flow chart of an exemplary pixel shading method in accordance with one embodiment.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Systems and methods that facilitate efficient and effective graphics shadow rendering are presented. In one embodiment, the systems and methods facilitate dynamic re-projection with hybrid frustum-traced shadows. Frustum-Traced Raster Shadows using Irregular Z-Buffers (FTIZB) creates a mapping of screen space pixels to light space pixels. However, even with the use of advanced techniques for generating high quality cascades such as Sample Distribution Shadow Mapping (SDSM), it is easy to wind up with large areas of the screen mapping to a handful of light space pixels. This is what leads to massive spikes in performance and very poor machine occupancy.

Embodiments of the present invention solve this problem by applying Dynamic Re-projection of Shadow Maps (DRSM). In a preferred embodiment, two new compute shader (CS) passes are performed before FTIZB. In one or more embodiments, the first CS pass includes a screen space pass, which performs a quantized count of screen pixels mapping to each light space pixel (based on the original cascade configuration). The second CS pass identifies areas with non-zero list length and high-list length, based upon a pre-determined tolerance (e.g., a user-defined threshold). The areas identified during the second pass are re-projected as new light space frusta, the matrices of which are stored in a GPU side buffer along with the number of new re-projections.

After, screen pixels are mapped to light space pixels using the dynamically created re-projections, primitives are then rendered in light space, the list of screen pixels that map to it are traversed and frustum tests are performed.

During the frustum tracing pass, the incoming pixel positions are un-projected (e.g., by a graphics shader), which produces multiple primitives that are re-projected based on the GPU side buffer described above. This has the effect of removing most redundant light space areas. Since the new re-projections are subsets of the original, when they are mapped to the same resolution light space, it has the effect of spreading long lists over a wide area, which dramatically improves the occupancy of the machine. This has been shown to remove performance spikes of over 30 ms.

One big advantage this technique has over SDSM approaches is that no CPU read-back is required. The originally supplied light space can still be used by the frustum and occlusion culling systems, which makes for very easy integration with existing graphics rendering technologies.

Conventional systems that produce a hard shadow typically do not account for the concept of the distance between the blocker and the viewer. In one embodiment hybrid frustum traced include processes that approximate the eye-view space position of each primitive in the graphics shader. The delta between the approximate triangle position and the screen position being tested is computed in the pixel shader, and an interlocked Min is performed to store the minimum blocker distance to a full screen buffer. Hybrid frustum trace processes can test both front and back facing primitives.

Traditional approaches to shadow processing often involve longer lists of screen pixels mapped to light space areas than a hybrid frustum trace process with dynamic re-projection. The conventional system and processes that generate longer lists of screen pixels mapped to light space areas can cause significant spikes in performance as compared to hybrid frustum trace systems and processes. Hybrid frustum traced approaches introduce a new technique for dynamic re-projection of shadow maps that provides for shorter lists and reduced performance spikes when of a number pixels mapped to a light space area exceed a limit or threshold. Traditional approaches under similar light space mapping scenarios (e.g., when a number pixels mapped to a light space area exceed a limit or threshold, etc.) typically have longer lists and performance spikes. Traditional techniques further do not typically support testing of both front and back facing primitives. Conventional approaches that use irregular z-buffers are typically limited to hard shadow production. In one embodiment, hybrid frustum trace approaches can include an interpolation between hard and soft shadows utilized in the generation of rendered images.

The method of interpolation described herein allow for full penumbra size. Existing approaches require dedicated ray tracing hardware and APIs, which limit the appeal to content developers. In addition, known approaches perform filtering for soft shadows in screen space, which does not yield the correct penumbra shape, and also suffers from continuity errors due to boundaries in depth. In contrast, embodiments of the present invention leverage hardware or software executed conservative rasters, and performs filtering in light space. HFTS implements a new system which defines the level of the penumbra shift at both ends of the spectrum.

Anti-aliased hard shadows may be rendered in a real-time using a light space visibility buffer. The light space visibility buffer can be an irregular z-buffer (IZB). In one exemplary implementation, an irregular z-buffer shadow rendering technique imposes no constraints on light, camera, or geometry, allowing fully dynamic scenes without pre-computation. Unlike conventional shadow map techniques, no spatial or temporal aliasing is introduced, and sub-pixel shadows from objects difficult to capture (e.g., grass, wires, etc.) may be smoothly animated. An IZB can use a light-space buffer, unlike convention shadow mapping that uses a light-space z-buffer. In one embodiment, texels in the light-space buffer stores references to pixels potentially occluded by geometry in the particular texel. In one exemplary implementation, a texel stores a linked list of the pixels.

In one embodiment, dynamic re-projection is utilized curtail the length or size of lists in the light space visibility buffer. In one exemplary implementation, a threshold for a number of pixels projected or mapped to a portion or area of a light space grid is established. If the threshold is exceeded, a separate list is created based upon dynamic re-projected of the subset of pixels in the portion or area to a separate light grid. The separate light grid array can have similar dimensions or size of light grid cells in the x and y axis.

FIG. 1 is a flow chart of an exemplary pixel shading method 100 in accordance with one embodiment. The flow chart in FIG. 1 introduces high level process operations of an exemplary pixel shading method. Additional explanation regarding operations similar to those included in pixel shading method 100 is provided in subsequent portions of the detailed description.

At block 110, generate pixel depth information is generated. In one embodiment, a rasterization pre-pass is performed to generate the pixel depth information. The depth information can include information in a z-buffer in eye-space. Compared with a two-dimensional screen-space, eye-space is a three-dimensional space as viewed from the eye. In one embodiment, when single sample shadows are used, the z-buffer stores only pixel fragment depths. To produce anti-aliased shadows, intersections with grid cell frustums are determined and additional data is needed in the z-buffer. In one embodiment, three additional values are stored in the eye-space G-buffer to define the pixel fragment footprint in light-space. The three additional values may be represented in a floating point format. In another embodiment, the three additional values are not stored in the z-buffer and are instead computed from the normal vector of the pixel fragment.

In block 120, light-space visibility information is generated using dynamic re-projection. The light space visibility information can be stored in a light space visibility buffer. The light-space visibility buffer can be associated with a light source. The light space visibility information can be an irregular z-buffer. In one embodiment, dynamic re-projection includes creating multiple projection matrices based upon density of pixel projections in an area of a light space grid. A first projection matrix can be a subset of a portion of initial projection information corresponding to density of pixel projections in an area of a light space grid that exceed a threshold. A second projection matrix can include the initial projection information minus the subset pixels in the first projection matrix. The light space visibility information can include list head information generated based on information in the multiple matrices and node information. Additional description of light-space visibility buffer generation is set forth if later portions of the detailed description.

In block 130, hard shadow information is generated based on the light-space visibility buffer from block 120. Generation of the hard shadow information can include a point in frustum test. The point in frustum test can reduce the number of pixels included in a shadow. Additional description of point in frustum testing and hard shadow information generation is set forth if later portions of the detailed description.

In block 140, the pixels are shaded based on information in the hard shadow. In one embodiment, pixel data stored in the eye-space G-buffer is processed based on the visibility information in a light-space visibility buffer (e.g., an irregular z buffer, a shadow mask buffer, etc.) to produce a frame buffer for display. The light-space visibility buffer indicates whether a pixel (or sample within a pixel) is in shadow or not. In one embodiment, the light-space visibility buffer can be used to modulate the color of a pixel.

With reference back to block 120, light-space visibility information is associated with a two-dimensional light-space grid corresponding to a light source in a scene. In one embodiment, for a grid cell in the light-space grid, the light-space visibility information includes a set of rendered pixel fragments that cover the grid cell when projected from screen-space into light-space. Rendered pixel fragments are pixels having at least one sample location within the pixel that is covered by a graphics primitive. In one exemplary implementation, 3D graphics primitives in a scene are rendered to produce a 2D image in screen-space. A pixel fragment is an intersection of a graphics primitive and the screen-space pixel (e.g., a portion of the screen-space pixel that is covered by the graphics primitive, etc.). In one embodiment, a light-space visibility buffer includes identifiers of pixels at an intersection of a graphics primitive. In one exemplary implementation, the identifier can be a position of the screen-space pixel or a pointer to the screen-space pixel.

Figure 2A:
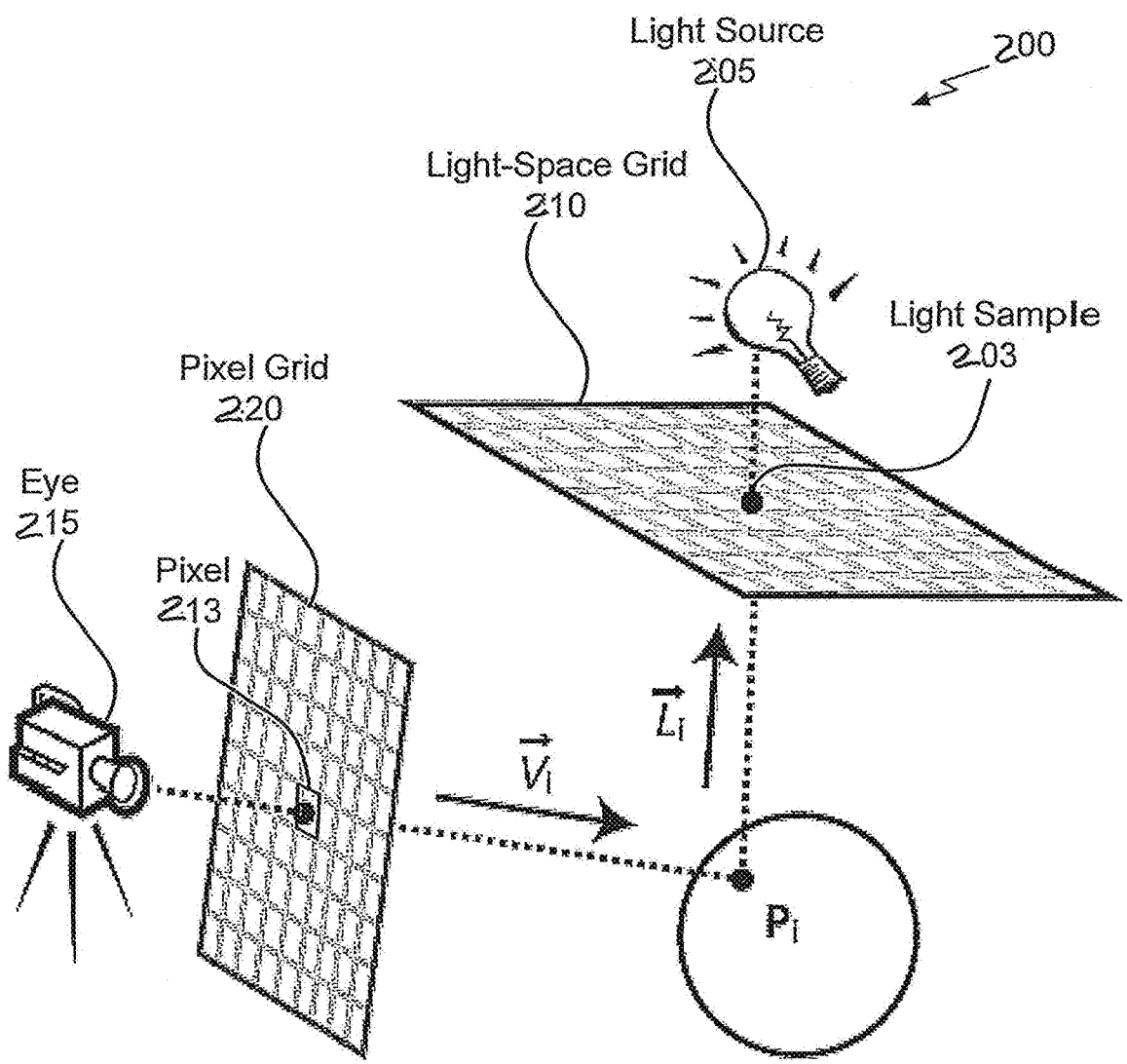
FIG. 2A illustrates mapping of pixels to a light-space grid in accordance with one embodiment.

FIG. 2A illustrates mapping of pixels to a light-space grid 210, in accordance with one embodiment. By construction, an IZB objectively maps a pixel in a pixel grid 220 to a sample in light-space, thereby discretizing light-space. A pixel 213 represents pixel ray $\vec{V}_i$ from an eye view point 315 and intersecting a graphics primitive at sample point $\vec{P}_i$. A corresponding light sample 203 in a light-space grid 210 represents light ray $\vec{L}_i$ from $P_i$ to the light source 205. In one embodiment, queries along the light ray $\vec{L}_i$ return the nearest neighbor sample on the light-space grid 210 rather than the true visibility along light ray $\vec{L}_i$, which can cause aliasing in shadow mapping where the grid stores explicit visibility.

A light-space visibility buffer can be configured to store the light samples of the light-space grid 210. The light-space visibility buffer can be an irregular Z-buffer (IZB). In one embodiment, all sample points $P_i$ that are within a grid cell of the light-space grid 210 may be stored in the light-space visibility buffer. In one exemplary implementation this enables computation of exact shadows. The light-space visibility buffer can be used during rendering to generate a unique visibility for a pixel in the pixel grid 320.

In one embodiment, the light-space visibility buffer includes irregular z-buffer shadow mask information. In one embodiment, constructing or generating an irregular z-buffer shadow mask is accomplished by "rasterizing" occluding geometry over the irregular set of light rays $\vec{L}_i$ and determining the closest geometry along each light ray $\vec{L}_j$. If the depth of the closest geometry lies between the light and the sample point $P_i$ the pixel 213 corresponding to the pixel ray that intersects the sample point $P_i$ is shadowed. In one exemplary implementation, shadowed means that a sample point is not directly illuminated by a light source and the sample point is only indirectly illuminated (e.g., by a reflected light ray) if the sample point is illuminated at all.

Figure 2B:
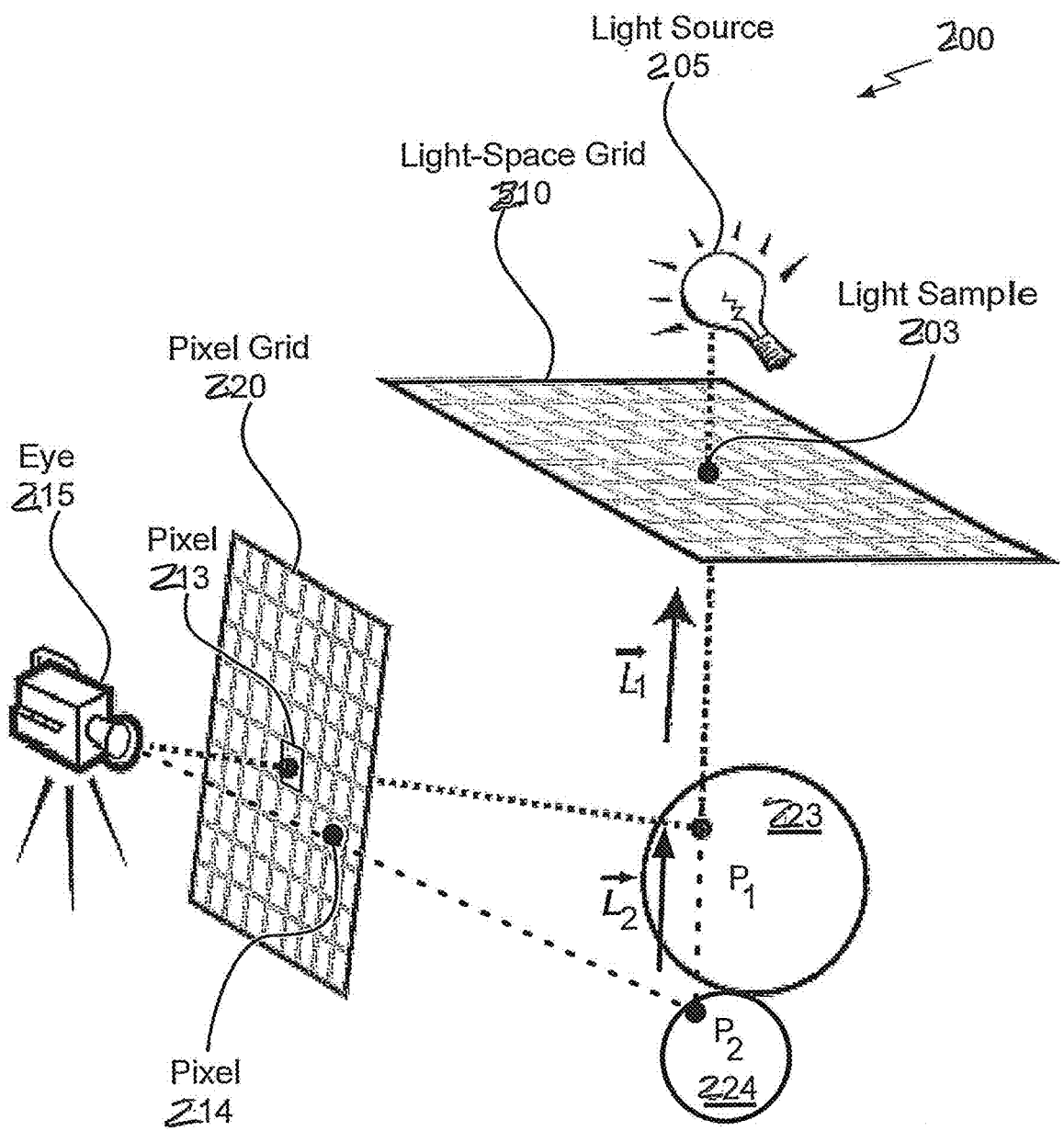
FIG. 2B illustrates a first object that occludes a second object in light-space in accordance with one embodiment.

FIG. 2B illustrates a first object that occludes a second object in light-space, in accordance with one embodiment. A first object 223 casts a shadow onto a second object 224. The pixel 213 represents a first pixel ray from the eye view point 215 that intersects a first graphics primitive of the first object 223 at sample point $P_1$ on the first graphics primitive. The corresponding light sample 203 in the light-space grid 210 represents a light ray $\vec{L}1$ from $P_1$ to the light source 205 that intersects the light-space grid 210 at light sample 203. A second pixel 214 represents a second pixel ray from the eye view point 215 that intersects a second graphics primitive of the second object 224 at sample point $P_2$ on the second graphics primitive. The same light sample 203 in the light-space grid 310 represents a light ray $\vec{L}_2$ from $P_2$ to the light source 205. Sample points $P_1$ and $P_2$ are both stored in the light-space visibility buffer and are associated with the grid cell that includes the light sample 203. The shadow mask queries along the light ray $\vec{L}_2$ indicate that the graphics primitives of the object 223 are closer to the light-space grid 210 than the sample point $P_2$. Therefore, the sample point $P_2$ is in shadow. Similarly, the shadow mask queries along the light ray $\vec{L}_1$ indicate that the sample point $P_1$ is closer to the light-space grid 210 than graphics primitives of the object 224. Therefore, the sample point $P_1$ is not in shadow.

Figure 2C:
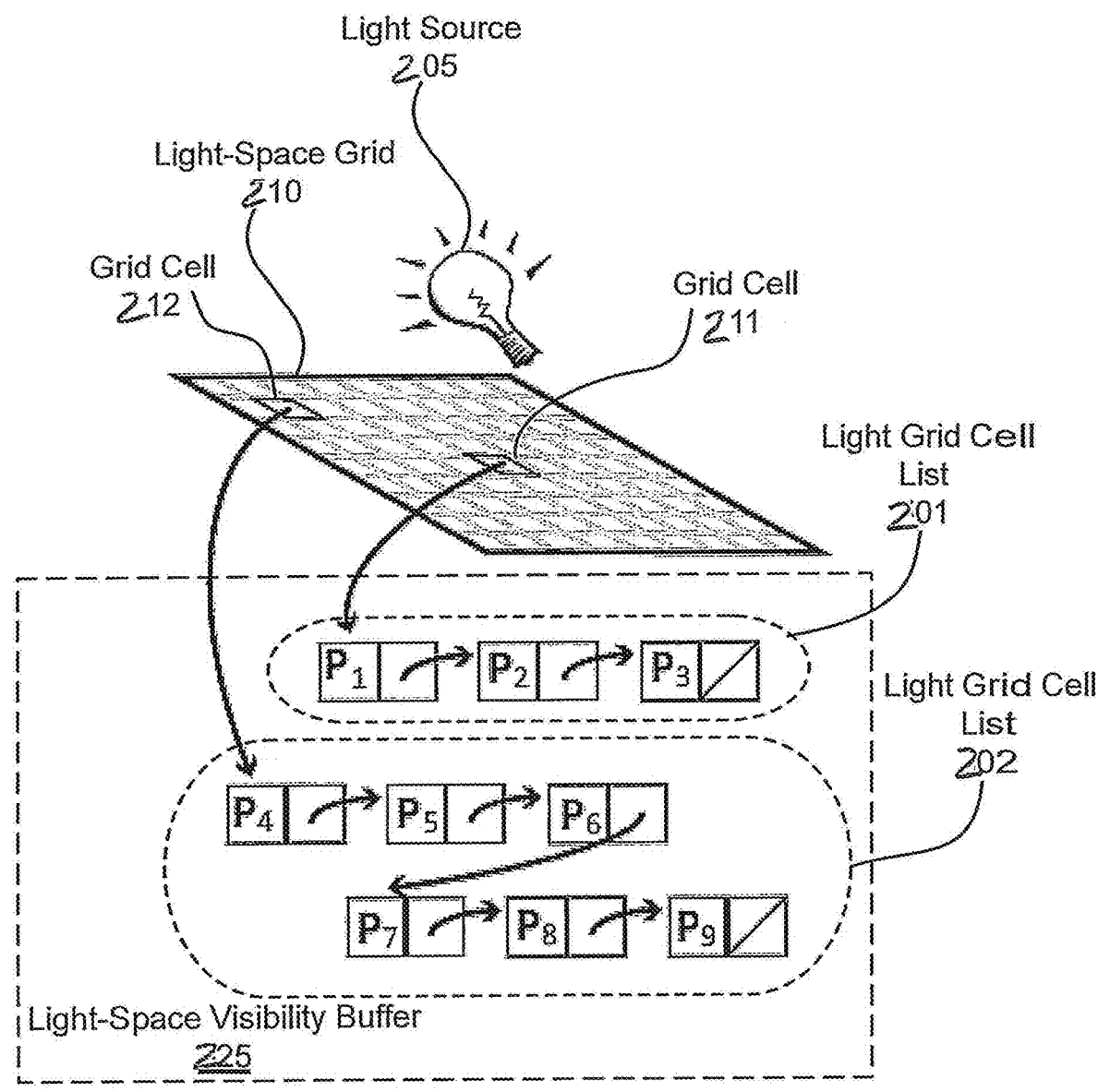
FIG. 2C illustrates a light-space grid and a light-space visibility buffer that is encoded as an irregular Z-buffer (IZB) in accordance with one embodiment.

FIG. 2C illustrates the light-space grid 210 and a light-space visibility buffer 225 that is encoded as an irregular Z-buffer (IZB), in accordance with one embodiment. Since modern GPUs typically rasterize over regular, consistently sized screen-space samples, the irregular sets of pixel fragment footprints are stored separately from the pixel data (e.g., per-pixel attribute data such as color, depth, texture coordinates, etc.). In one embodiment, the irregular pixel fragment footprints are stored in a grid-of-lists structure. The light-space grid 210 is a grid of cells. Each grid cell may correspond to a light-space head pointer which points to a light grid cell list representing pixel fragment footprints falling within the grid cell. In contrast, with a conventional shadow map that stores depth values, a grid cell of a light-space grid 210 stores a pointer to a list of pixel fragment footprints associated with screen-space pixels. In one embodiment, the light grid cell list is a linked-list.

Since pixel fragment footprints can lie anywhere within a grid cell, conservative rasterization can be used to render graphics primitives in a 3D scene in light-space and generate the shadow mask buffer using the light-space visibility buffer 225. The graphics primitives should test pixel fragment footprints for occlusion if the graphics primitive intersects or covers any portion of a grid cell (not just the center, as in traditional rasterization).

A grid cell 211 is associated with an index or light-space head pointer which points to a light grid cell list 201. In one embodiment, a light grid cell list includes a list of nodes and a pointer to the next node in the list. Each node represents a pixel fragment footprint. In one embodiment, when each pixel includes N sample locations, a node represents a single sample point. In another embodiment, when each pixel includes N sample locations, a node represents a single pixel with N sample points. In either case, the index, or light-space head pointer, points to the first node in the light grid cell list 201. The light grid cell list 201 includes three nodes storing sample points (or pixels) $P_1$, $P_2$, $P_3$. A grid cell 212 corresponds to a light-space head pointer which points to a light grid cell list 202. The light grid cell list 202 includes six nodes that store sample points (or pixels) $P_4$, $P_5$, $P_6$, $P_7$, $P_8$ and $P_9$.

Figure 2D:
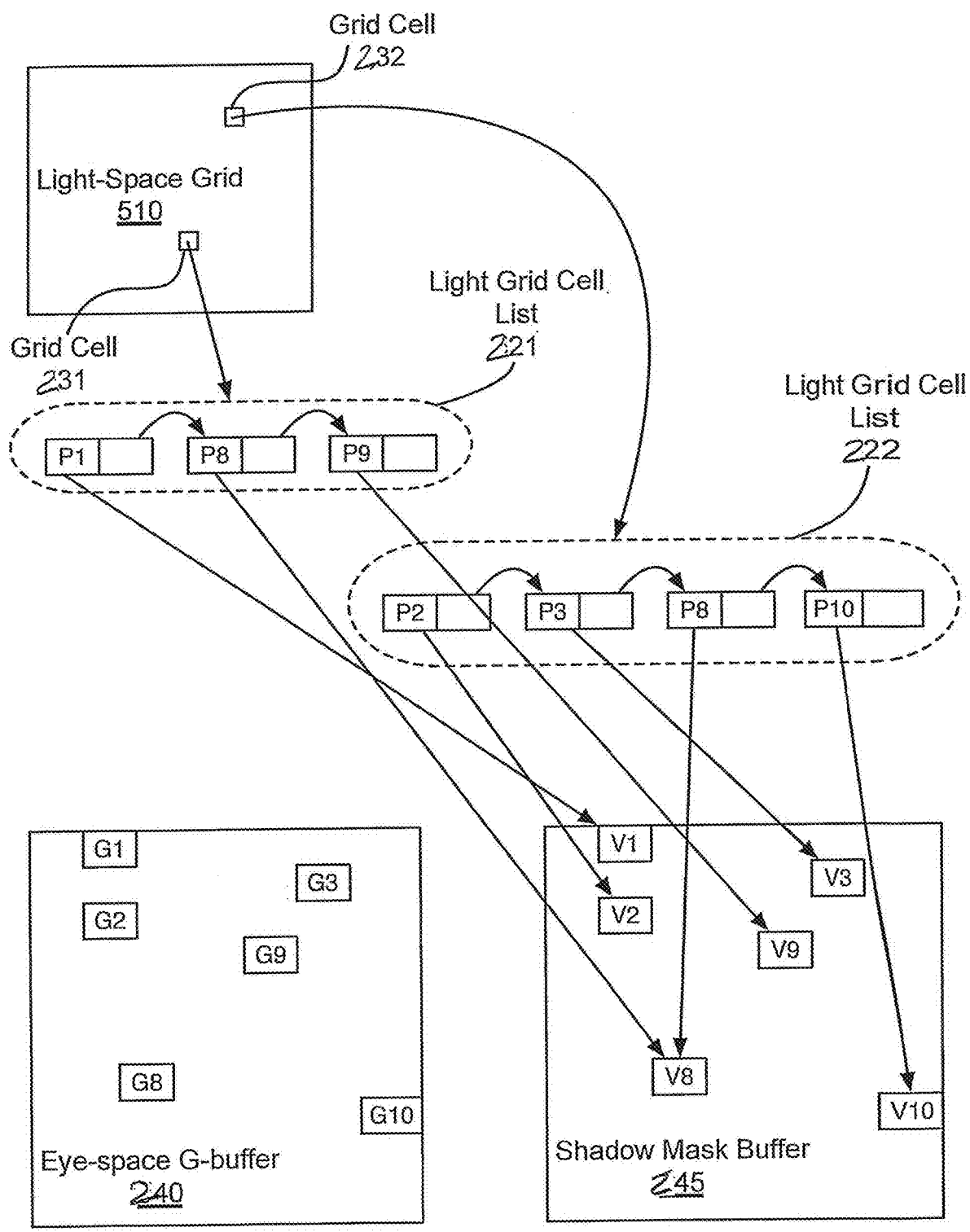
FIG. 2D illustrates the light-space visibility buffer data structure and a corresponding eye-space G-buffer in accordance with one embodiment.

FIG. 2D illustrates the light-space visibility buffer data structure and a corresponding eye-space G-buffer 240, in accordance with one embodiment. The light-space visibility buffer data structure includes light grid cell lists and a shadow mask buffer 245. A light grid cell list 221 is associated with a particular grid cell in the light-space grid 210, and grid cell 231. A light grid cell list 222 is associated with the grid cell 232. The grid cell 331 stores an index to a first node corresponding to sample point $P_1$ in the light grid cell list 221. The grid cell 232 stores an index to a first node corresponding to sample point $P_2$ in the light grid cell list 222. The node data (e.g., visibility data) is stored in a shadow mask buffer 245. In one embodiment, each node in a light grid cell list is two integers, including a next index that points to the next sample point in the light grid cell list and an index to the corresponding eye-space G-buffer pixel sample location in the eye-space G-buffer 240. In another embodiment, each node address is the same as the G-buffer index for the pixel (i.e., the node addresses are directly mapped to the pixels), so each node stores only the next index that points to the next node in the light grid cell list.

In one embodiment, the shadow mask buffer 245 is the same resolution as the display image (e.g., screen resolution) and each location in the shadow mask buffer 245 corresponds to a location in an eye-space G-buffer 240. In one exemplary implementation, an index to a corresponding eye-space G-buffer pixel sample location corresponds directly to a visibility sample stored for the same pixel sample location in the shadow mask buffer 245. In one embodiment, each location in the shadow mask buffer 245 stores a visibility sample. The visibility sample can be a binary shadow visibility value for a fragment that covers an eye-space G-buffer pixel sample location. The nodes associated with sample points $P_1$, $P_8$, and $P_9$ in the light grid cell list 221 point to the visibility values $V_1$, $V_8$, and $V_9$ respectively, in the shadow mask buffer 245.

The visibility values $V_1$, $V_8$, and $V_9$ correspond to the pixel sample locations $G_1$, $G_8$, and $G_9$, respectively, in the eye-space G-buffer 240. Similarly, the nodes associated with sample points $P_2$, $P_3$, $P_8$, and $P_{10}$ in the light grid cell list 222 point to the visibility values $V_2$, $V_3$, $V_8$, and $V_{10}$ respectively, in the shadow mask buffer 245. The visibility values $V_2$, $V_3$, $V_8$, and $V_{10}$ correspond to the pixel sample locations $G_2$, $G_3$, $G_8$, and $G_{10}$ respectively, in the eye-space G-buffer 240. Nodes in different light grid cell lists may point to the same visibility sample in the shadow mask buffer 245, such as nodes $P_8$ in light grid cell lists 221 and 222. When two different objects map to the same pixel in eye-space, nodes in two different light grid cell lists point to the same visibility sample. Two grid cells can also share the same visibility sample when a pixel fragment footprint has multiple samples that project into separate light grid cells.

An eye-space G-buffer 240 is the same resolution as the display image (e.g., screen resolution). In one embodiment, each location in the eye-space G-buffer 240 stores a fragment position in a coordinate space (e.g., eye-space), surface normal vector, and other information needed to reconstruct a pixel-sized quadrilateral or pixel fragment footprint on the fragment's tangent plane at the sample point $\vec{P}_i$. In one exemplary implementation, the pixel fragment footprint is centered on the light ray $\vec{L}_i$ that intersects one or multiple grid cell(s) in the light-space grid 210.

The light-space visibility buffer 225 may be used to generate the shadow mask buffer 245 during rasterization of the scene in light-space. Rasterizing over irregular pixel fragment footprints can require knowing where the pixel fragment footprints occur in screen-space. In one embodiment, a rasterization pre-pass (in eye-space) is used to identify the locations of visible pixel fragments requiring shadow queries. A z-buffer portion of the eye-space G-buffer 240 is generated during the rasterization pre-pass to determine a nearest depth value for each visible pixel fragment in the pixel grid 220. The visible pixel fragments correspond to light samples in the light-space grid 210. The locations of the light samples in the light-space grid 210 are identified by executing a compute pass over the z-buffer, transforming pixel fragments into light-space (via a shadow map transformation) to generate the pixel fragment footprints. The pixel fragment footprints are then inserted into corresponding light-space grid cell lists. In one embodiment, identifiers corresponding with the pixel fragment footprints are inserted into the corresponding light-space grid cell lists.

Figure 3:
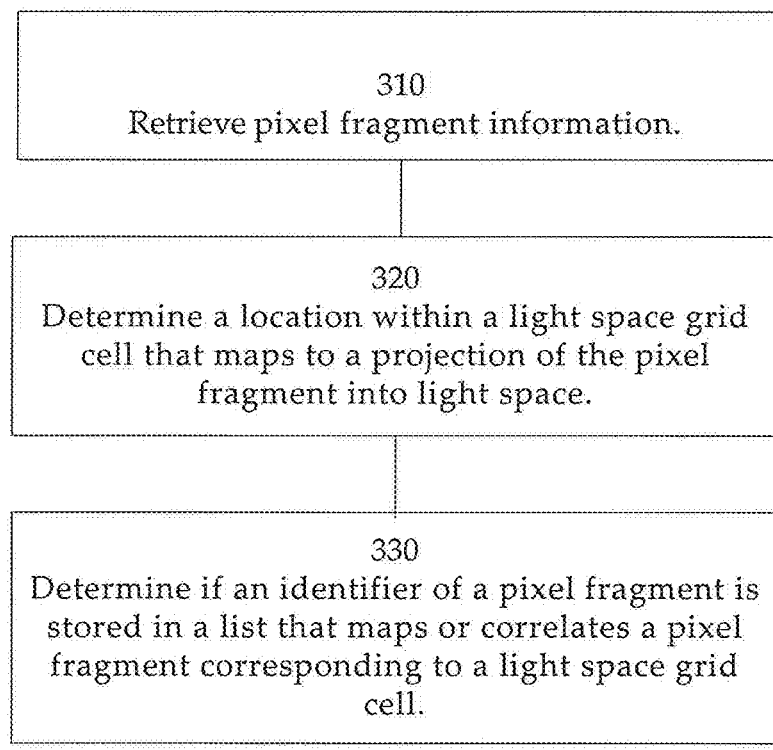
FIG. 3 is a flowchart of an exemplary pixel fragment projection process method in accordance with one embodiment.

In one embodiment, generating a light-space visibility buffer or projection matrix buffer utilizes a pixel fragment projection process. FIG. 3 is a flowchart of an exemplary pixel fragment projection process method 300 in accordance with one embodiment. The pixel fragment projection process identifies rendered pixel fragments that cover a light space grid cell when projected from screen-space into light-space.

In block 310, pixel fragment information is retrieved. In one embodiment, the pixel fragment information is associated with a pixel grid in eye-space. The pixel fragment can be a portion of the pixel including a sample within the pixel. In one embodiment, the pixel fragment can be an entire pixel and can including all of the samples within the pixel. In one exemplary implementation, pixel fragment information includes information corresponding to pixels in pixel grid 220 of FIG. 2A. The pixel fragment information can include information corresponding to a pixel ray from an eye view point intersecting a graphics primitive at a sample point.

In block 320, a location within a light space grid cell that maps to a projection of the pixel fragment into light space is determined. The light space grid cell can be included in a light-space grid corresponding to a light source. In one exemplary implementation, light space grid cell corresponding to a light space grid 210 of FIG. 2A. In one embodiment, a light ray is projected from a pixel fragment to the light space grid cell. In one exemplary implementation, the light ray is projected to the light space grid cell from a graphics primitive associated with the pixel. The point in the light space grid cell that is intersected by the light ray is a light sample.

In block 330, an identifier of a pixel fragment is stored in a list that maps or correlates a pixel fragment corresponding to a light space grid cell determined in block 320. In one embodiment, a list is similar to a light grid cell list (e.g., 201, 202, 221, 222, etc.) in FIGS. 2C and 2D. In one embodiment, the pixel fragment footprint is associated with the location within a grid cell.

Figure 4A:
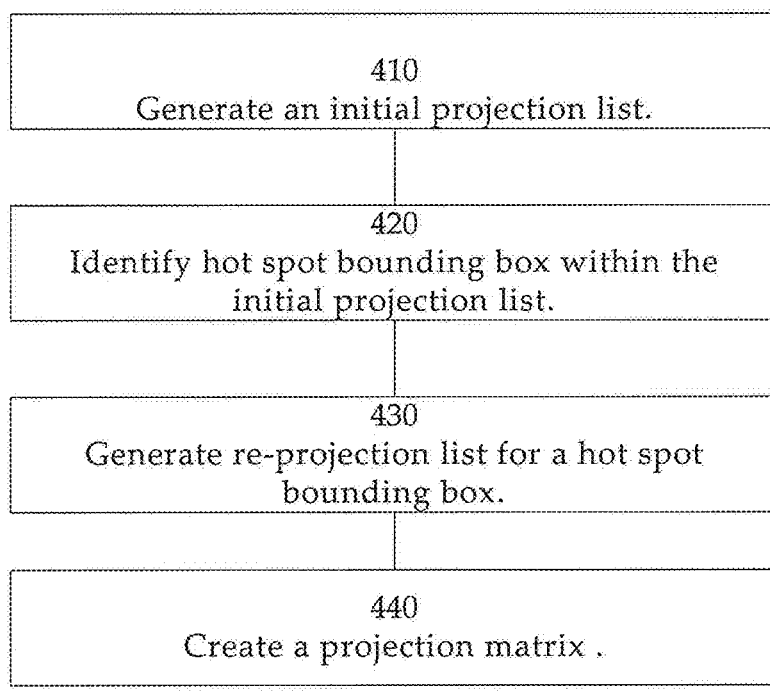
FIG. 4A is a flowchart of an exemplary dynamic re-projection method in accordance with one embodiment.

FIG. 4A is a flowchart of an exemplary dynamic re-projection method 400 for generating projection matrix information accordance with one embodiment. The projection matrix information can be included in a projection matrix buffer. The projection matrix information can be utilized to generate light space visibility information. In one embodiment, dynamic re-projection method 400 is similar to process used to generate light-space visibility information similar to block 120 in FIG. 1. The light space visibility information can be included in an irregular z buffer.

In block 410, an initial projection list is generated. In one embodiment, an initial projection list is generated utilizing a projection process similar to pixel fragment projection process 300. In one exemplary implementation, the initial projection list includes all the light space grid cells. In another exemplary implementation, the initial projection list includes a portion of all the light space grid cells, wherein the portion includes all the light space grid cells that are initially mapped to a corresponding pixel fragment. FIG. 5A is an exemplary listing of an initial projection list in accordance with one embodiment.

In block 420, a determination is made if the initial projection list indicates portions of the light space grid include a number of pixel projections that exceed a threshold. If a portion of the light space grid includes a number of pixel projections that exceed a threshold, the bounds of the portion are identified. In one embodiment, a portion of light space grid cells in the light space grid that include a number of pixel projections that exceed a threshold is consider a "hot" location or "hot" spot. In one exemplary implementation, the initial projection list can function as a heat map. FIG. 5B is a block diagram of a visual representation of the initial projection list with light space cells, in which light space grid cells that map to greater numbers of pixels projections are shown in darker shades of grey in accordance with one embodiment. In one embodiment, a compute shader is utilized to build a two dimensional bounding box around areas of the heat map that have that lists pixels that exceed a threshold mapped to the light space cells. The threshold can be based upon a user defined tolerance. In one exemplary implementation, the darker the light space grid cell the "hotter" the area is (e.g., the greater the number of pixels that project to the light space grid cell, etc.).

In one embodiment, based upon a threshold light space grid cells are bounded or identified in a hot area. In one exemplary implementation, hot spot bounding box 599 is identified. Hot spot bounding box 599 includes light space grid cells 552, 553, 554, 555, 556, 562, 563, 564, 565, 566, 672, 572, 573, 574, 575, and 576.

In block 430, a re-projection list is generated corresponding to the hot spot bounding box. In one embodiment, a pixel fragment projection process similar to process 300 is utilized to create a projection list representing the re-projection of the subset of pixel fragments into a light-space grid. In one embodiment, the new "heat" re-projection matrix is a subset of the original projection matrix. That projection matrix is then applied to a similar width and height texture grid in light space, basically spreading out those pixels across a much wider area. In one exemplary implementation, spreading out the pixels to a similar width and height texture in light space basically quadratically reduces the length of the list. FIG. 5C is an exemplary listing of an exemplary re-projection list in accordance with one embodiment. The re-projection list represents the bounded area of the initial projection list (e.g., light space grid cells 552, 553, 554, 555, 556, 562, 563, 5643, 565, 566, 672, 573, 574, 575, and 576, etc.) spread out over a wider light space grid (e.g., including light space grid cells 1511 to 1587, etc.). FIG. 5D is a block diagram of a visual representation of the re-projection list with light space cells from the bounding area of the initial projection list, in which light space grid cells that map to greater numbers of pixels projections are shown in darker shades of grey in accordance with one embodiment. In one embodiment, the list lengths for the grid cells in the re-projection lists are shorter or smaller that in the initial projection bounded area. For example, there are a number of grid cells in FIGS. 5A and 5B (e.g., 552, 553, 554, 555, 556, 562, 563, 5643, 565, 566, 574, and 575) with projection lists or footprints that include 4 pixels. Where as there are no light space grid cells in FIGS. 5C and 5D with projection lists or footprints that include 4 pixels. The longest projection list or footprints for a light space grid cell includes 3 pixels (e.g., 1553, 1554, etc.).

Figure 5F:
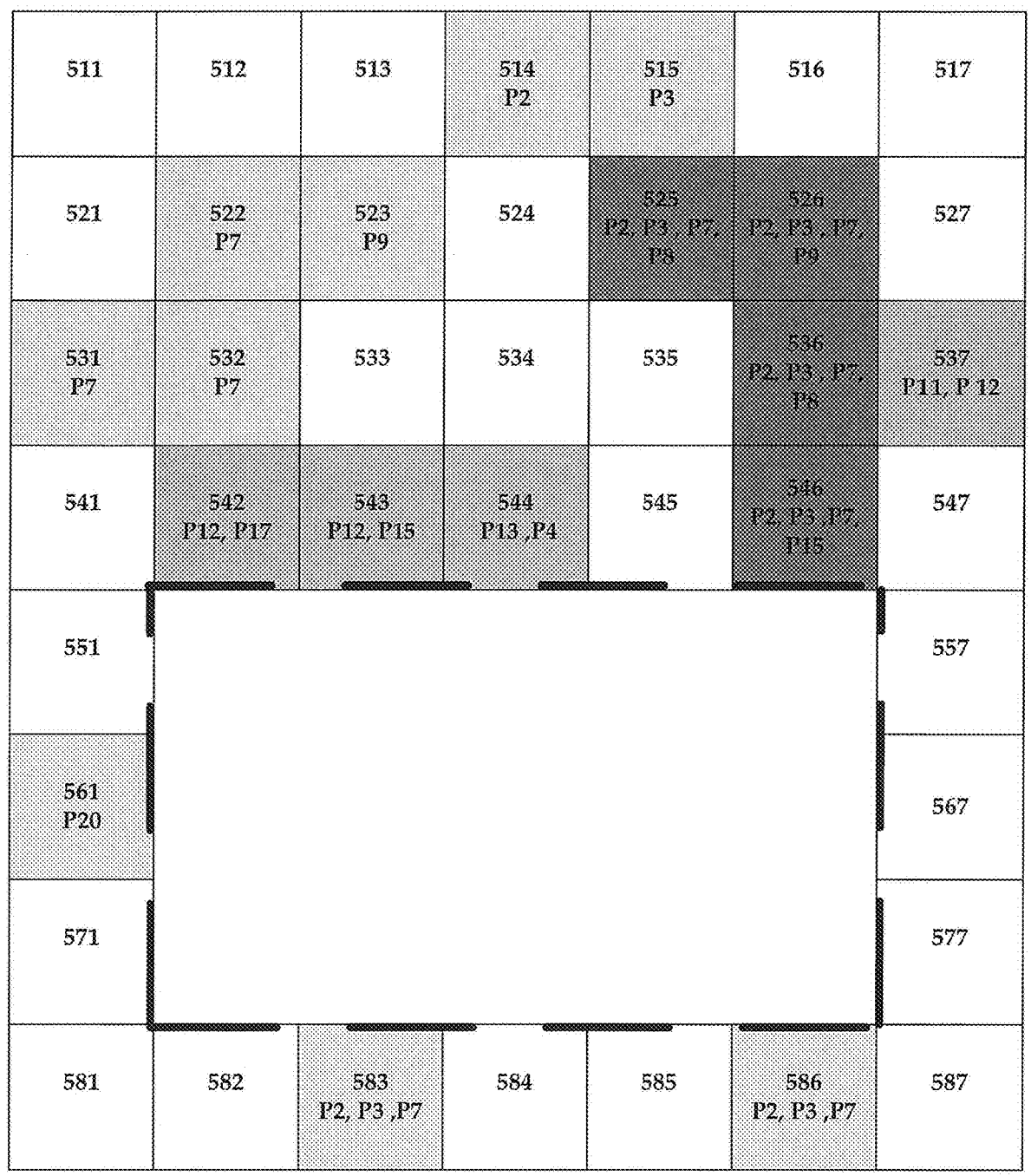
FIG. 5F is a block diagram visual representation of an exemplary original projection list minus the hot spot bounding area.

In Block 440, a projection matrix buffer is created and includes the projection matrices. The projection matrix buffer can include multiple projection matrices. One of the multiple projection matrices is the original projection list minus the hot spot bounding area. FIG. 5E is an exemplary listing of an original projection list minus the hot spot bounding area in accordance with one embodiment. FIG. 5F is a block diagram visual representation of an exemplary original projection list minus the hot spot bounding area. In one embodiment, the table in FIG. 5C is reduced to the list in FIG. 5G and the table in figure E is reduced to the list in FIG. 5H.

If no hot spot matrix is determined in block 420 then the projection matrix buffer includes the original projection list.

Figure 4B:
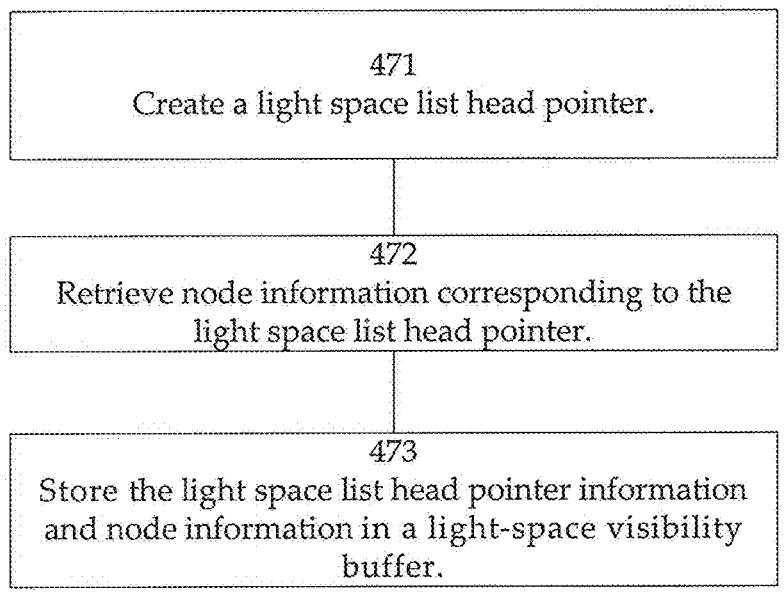
FIG. 4B is a flowchart of an exemplary light space visibility buffer generation method in accordance with one embodiment.

In one embodiment, projection matrix buffer information is utilized to create light space visibility information. FIG. 4B is a flowchart of an exemplary light space visibility buffer generation method 470 in accordance with one embodiment.

In block 410, a light space list head pointer is created. In one embodiment, light space list head pointer is based upon corresponding projection matrix information in the projection matrix buffer. A light-space head pointer can point to a light grid cell list representing pixel fragment footprints falling within a light space grid cell. In one embodiment, the light grid cell list is a linked-list and the light space list head pointer points to the first pixel fragment in the light space grid cell list.

In block 472, node information corresponding to the light space list head pointer is retrieved. In one embodiment, each node in a light grid cell list is two integers, including a next index that points to the next sample point in the light grid cell list and an index to the corresponding eye-space G-buffer pixel sample location in the eye-space G-buffer.

In block 473, the light space list head pointer information and node information are stored in a light-space visibility buffer. In one embodiment, the node information is stored in a shadow mask buffer portion, which in turn is included in the light space visibility buffer.

One or more pixel fragment footprint identifiers associated with a grid cell can be stored in a light-space visibility buffer associated with that grid cell. In one embodiment, the identifier is a position of the screen-space pixel or a pointer to the screen-space pixel that was transformed to generate the pixel fragment footprint. In one embodiment, the light-space grid represents a visibility map and a grid cell stores an index to a list of pixel fragment footprint identifiers. In one embodiment, the light-space visibility buffer is an irregular Z buffer (IZB) that stores a set of identifiers for each grid cell, where the set of identifiers indicates pixels that are at least partially covered by a primitive that is potentially in shadow. A pixel fragment is in shadow when a graphics primitive is located between the grid cell and the pixel fragment footprint, thereby preventing the light source from reaching the pixel fragment.

Figure 6:
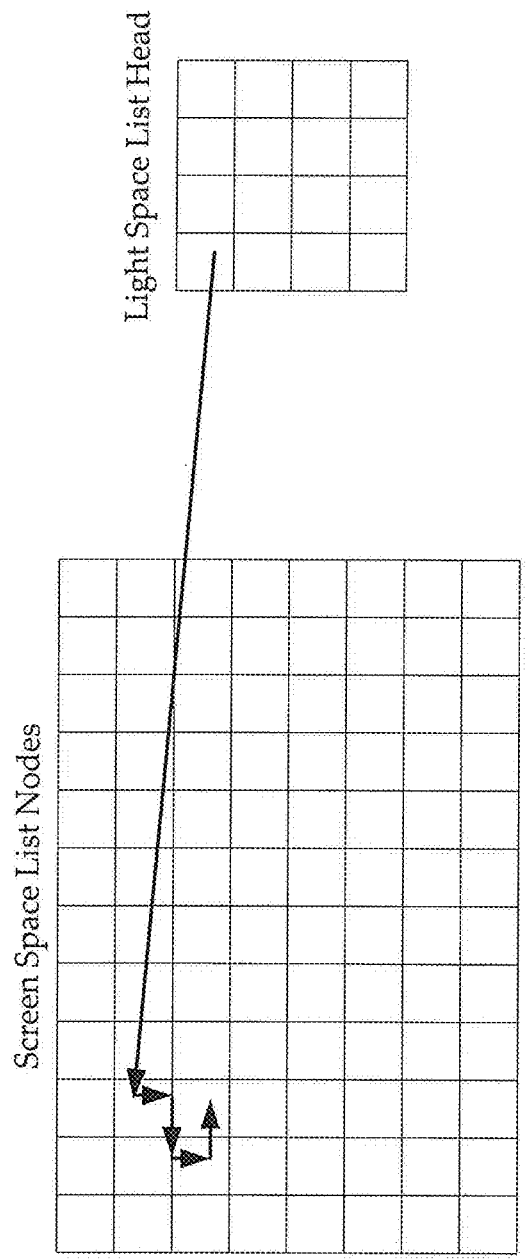
FIG. 6 is a block diagram showing an exemplary relationship of a light space list head identifier and screen space list nodes in an irregular Z buffer.

FIG. 6 is a block diagram showing an exemplary relationship of a light space list head identifier and screen space list nodes in an irregular Z buffer.

Figure 7A:
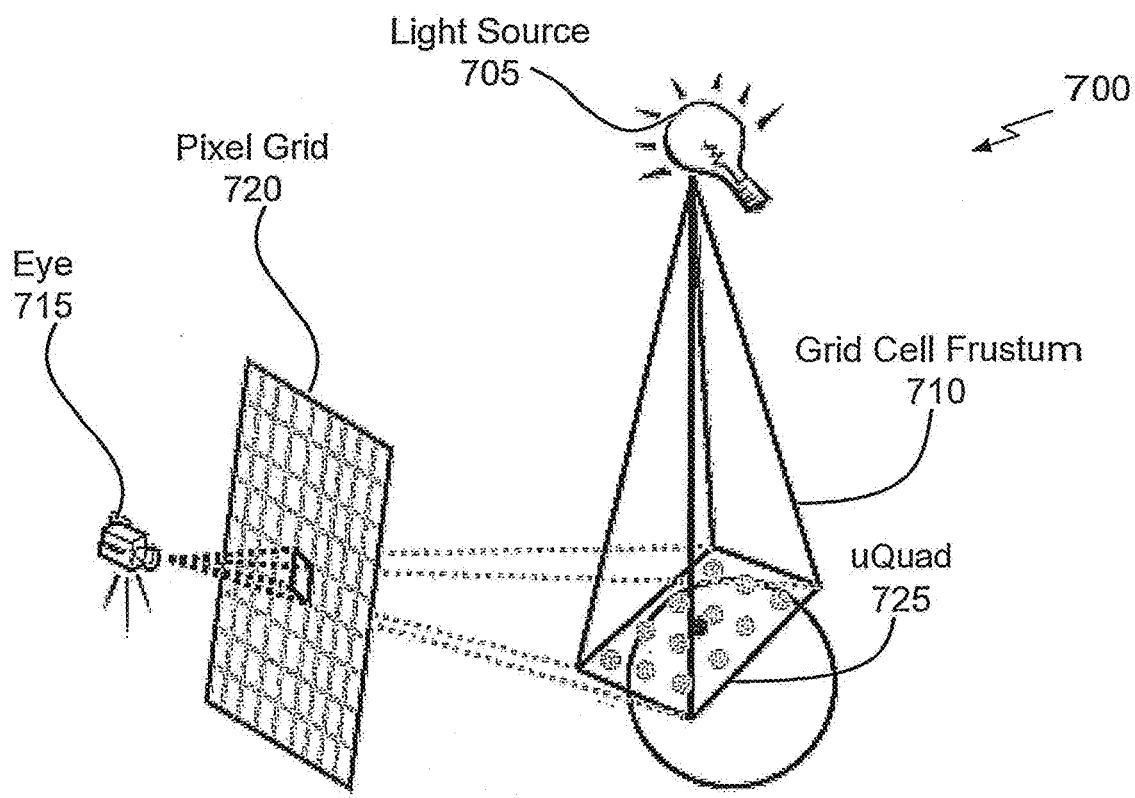
FIG. 7A is a block diagram of a conceptual representation of grid cell frustum corresponding to a light source to a pixel fragment footprint in accordance with one embodiment.

In one embodiment, a point in frustum test is utilized. In one exemplary implementation, the point in frustum test is utilized to determine a list of screen pixels mapped to a given light space frustum point. FIG. 7A is a block diagram of a conceptual representation of grid cell frustum 710 corresponding to a light source to a pixel fragment footprint shown as a pixel μQuad 725, in accordance with one embodiment. A pixel boundary is projected to a fragment tangent plane on an object to define the μQuad 725. The μQuad 725 is a pixel footprint at the tangent plane of a primitive that forms a base of the grid cell frustum 710.

Figure 7B:
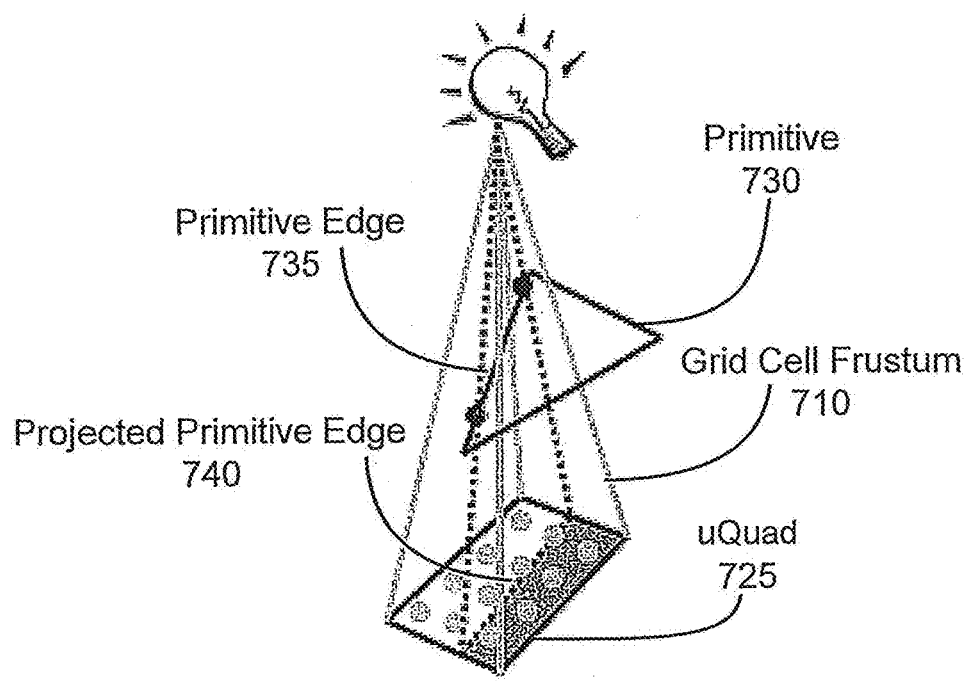
FIG. 7B is a conceptual diagram of a primitive intersecting a grid cell frustum in accordance with one embodiment.

FIG. 7B is a conceptual diagram of a primitive 730 intersecting the grid cell frustum 710 of FIG. 7A, in accordance with one embodiment. The edges (e.g., primitive edge 735) of each potentially occluding primitive, such as primitive 730, are projected to the tangent plane to perform an intersection test. Each projected primitive edge corresponds to a half-plane defining at least a portion of the μQuad 725 that is in shadow. The intersection of the projected primitive edge 740 with the μQuad 725 is then used to determine visibility of each sample within the μQuad 725. The intersections of the projected primitive edges with the μQuad 725 define the primitive fragment.

Each projected primitive edge 740 and the grid cell frustum 710 projected from the light source 705 defines a shadow quad for a triangle primitive 730. The three shadow quads corresponding to the three projected edges and the triangle primitive 730 bound a shadow volume within the grid cell frustum 710. The half-plane results for each edge are combined using a binary AND operation to generate a sample visibility bitmask representing the μQuad 725 samples (and the sub-pixel samples) that are occluded by the primitive 730. The sample visibility bit mask indicates the coverage of the primitive fragment. In one embodiment, the projected primitive edge 740 is used as an index to a lookup table that stores visibility sample values. The locations of the visibility samples may be fixed or programmable. In one embodiment, 64 visibility sample locations are defined within each pixel and within each μQuad 725. The results for each potentially occluding primitive are accumulated for the μQuad 725 to produce the final sample visibility bitmask that is stored in the shadow mask buffer for a pixel.

Using multiple visibility samples per pixel may also require multiple nodes per pixel fragment footprint, up to one node per visibility sample and multiple samples per pixel complicates generation of the light-space visibility buffer. Each pixel fragment footprint includes multiple samples that project to a variable number of light-space grid cells, and the pixel fragment footprint should be included in the light grid cell list for the grid cell. In one embodiment, μQuads (i.e., pixel fragment footprints) are rasterized in light-space during step. In another embodiment, the size of the light-space visibility buffer is increased to store multiple samples in each μQuad. For example, when a μQuad includes 32 samples, each grid cell is associated with the 32 samples within a single μQuad. In another embodiment, each grid cell is associated with a number of samples that is less than all of the samples in a single μQuad, as described further herein.

Figure 7C:
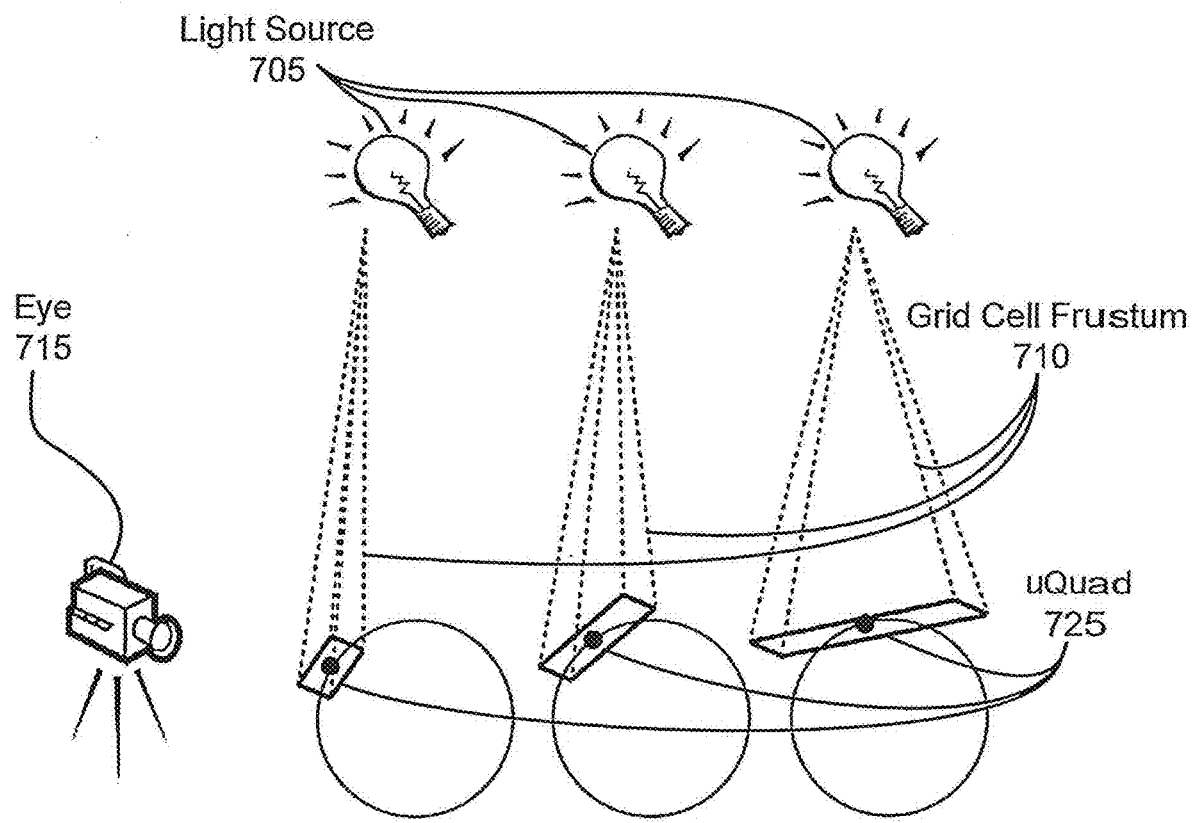
FIG. 7C is a conceptual diagram of grid cell frustum corresponding to a light source projecting to a pixel as a tangent plane of a primitive changes in accordance with one embodiment.

FIG. 7C is a conceptual diagram of grid cell frustum corresponding to a light source 705 projecting to a pixel μQuad as a tangent plane of a primitive changes, in accordance with one embodiment. As the tangent plane changes orientation, μQuad 725 elongates along only one axis in eye-space as $\vec{N}_i\vec{V}_i \to 0$ (the other axes depend on screen resolution). Therefore, the μQuad 725 may be sampled one dimensionally. In one embodiment, from one to eight samples are used for each μQuad, depending on the orientation of the particular μQuad. Using a variable sampling rate creates an approximate irregular light-space visibility buffer. As μQuads enlarge, some nodes may not be inserted into the light grid cell lists, thereby introducing light leaks for small distant occluding primitives that fall between samples (i.e., that fail to spawn needed frustum-primitive tests). To reduce the number of missed intersection tests that may contribute to light leaks, primitives can be over-conservatively rasterized. In one embodiment, light-space primitives are rasterized with a grid cell dilation equal to one grid cell (rather than a half grid cell in typical conservative rasterization), ensuring primitives touch more sample locations.

Figure 7D:
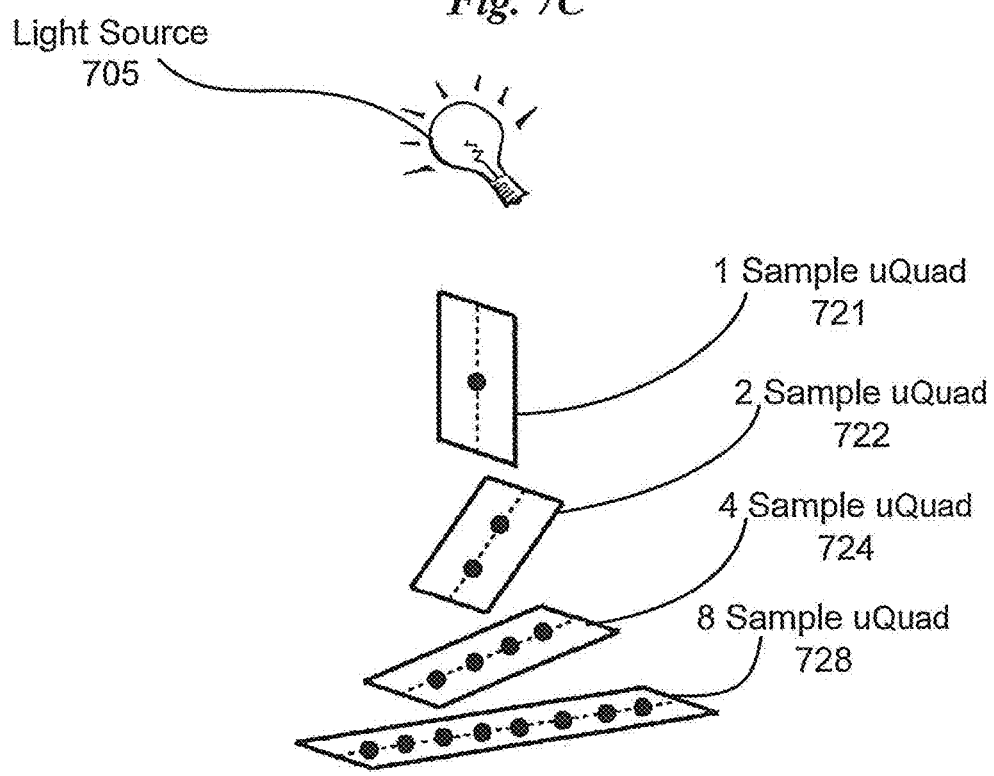
FIG. 7D is a conceptual diagram of sample locations within a pixel as the tangent plane of the pixel fragment changes in accordance with one embodiment.

FIG. 7D is a conceptual diagram of sample locations within the pixel μQuad 725 of FIG. 7C as the tangent plane of the pixel fragment changes, in accordance with one embodiment. Depending on the tangent plane, the μQuad 725 may be sampled as μQuads 721, 722, 724, or 728, sampling one, two, four, or eight samples, respectively.

Reducing the number of nodes in the light-space visibility buffer directly decreases average list length ($l_{izb}$) of each light grid cell list. While enlarging conservative raster dilation increases a primitive fragment count $t_f$ by a smaller amount. By using the tangent-based sampling to approximate the coverage of pixel fragments, on average two nodes are inserted per pixel compared to eight with an exact approach. Therefore, a four times reduction in ($l_{izb}$) is achieved. Increasing primitive fragment dilation from 0.5 to 1.0 pixels only increases $t_f$ 6-40%. Overall, a net improvement is accomplished when tangent-based sampling is used in combination with conservative rasterization.

As in shadow maps, selecting an appropriate light-space resolution is important. Unlike shadow maps, resolution does not impact quality but it may affect performance. Because the complexity of the light-space visibility buffer 525 is $O(t_f (l_{izb}))$, halving resolution grows the average list length four times while lowering the number of primitive fragments four times. Therefore, resolution seems to minimally impact performance. However, conservative rasterization also generates more primitive fragments, and the effect grows for small primitives and low resolutions. Larger resolutions increase memory consumption of the light grid cell list structure, though the number of nodes is largely invariant with light-space resolution. Overall, closely matching light-space and image resolutions does not increase $l_{izb}$ while also avoiding having many primitive fragments testing empty light grid cell lists.

Figure 8:
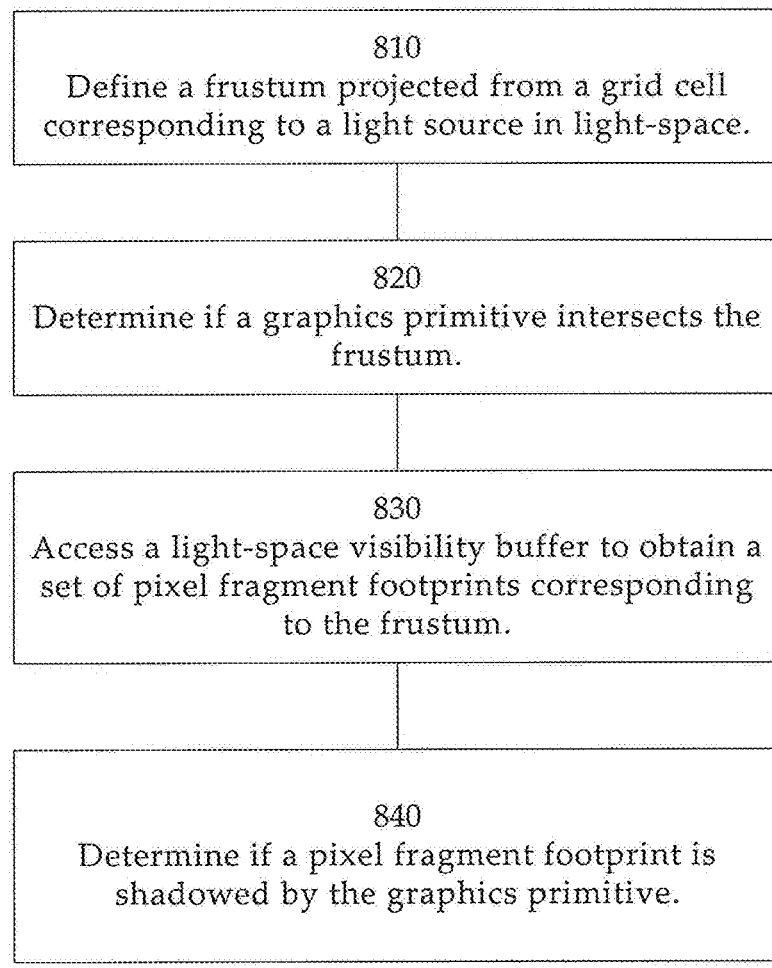
FIG. 8 illustrates a flowchart of a method for using a light-space visibility buffer to render shadows in accordance with one embodiment.

FIG. 8 illustrates a flowchart of a method 800 for using a light-space visibility buffer to render shadows, in accordance with one embodiment.

In block 810, a frustum projected from a grid cell corresponding to a light source in light-space is defined. In one embodiment, the grid cell is included in a light-space grid.

In block 820, a graphics primitive is determined to intersect the frustum. In one embodiment, a graphics primitive is associated with primitive attributes as well as a plurality of vertices, each vertex having one or more vertex attributes (e.g., color, texture coordinates, normal vector, etc.). A graphics primitive that intersects the frustum may cast a shadow on one or more pixel fragments corresponding to the grid cell, where each potentially shadowed pixel fragment is associated with a pixel fragment footprint identifier.

In block 830, a light-space visibility buffer is accessed to obtain a set of pixel fragment footprints corresponding to the frustum.

In block 840, it is determined if each of the pixel fragment footprints is shadowed by the graphics primitive. In one embodiment, a shadow mask buffer is updated for each pixel fragment footprints that is shadowed by the graphics primitive. The shadow mask buffer may indicate whether each sample within a screen-space pixel from which the pixel fragment footprint is generated is shadowed when multiple samples are included within each pixel.

In one embodiment, N sample locations are defined per pixel. For each graphics primitive being rendered, N color values are produced for each pixel that is fully covered by the primitive. The N color values correspond to the N sample locations. In some embodiments, each color value may also be associated with a transparency value, shadow value, and/or a depth value. The values associated with a given sample location may be written to a corresponding frame buffer at a location corresponding to the pixel. Each frame buffer may include a plurality of values included in a 2D array sized based on a resolution of a display screen (or at least a portion of the display screen). In one embodiment, a resolution of the shadow mask buffer equals a resolution of the frame buffer.

In one embodiment, rendering shadows using IZBs does not produce the same artifacts as when conventional shadow mapping is used, specifically aliasing artifacts resulting from mismatches between eye-space and light-space sampling locations are reduced or eliminated. Conventional shadow maps use a regular grid of samples in both eye-space and light-space, and finding a robust bijection between samples in the eye-space and light-space remains unsolved. By allowing light-space samples to occur irregularly, an IZB enables pairing of samples in eye-space and light-space and may eliminate or reduce aliasing.

Figure 9:
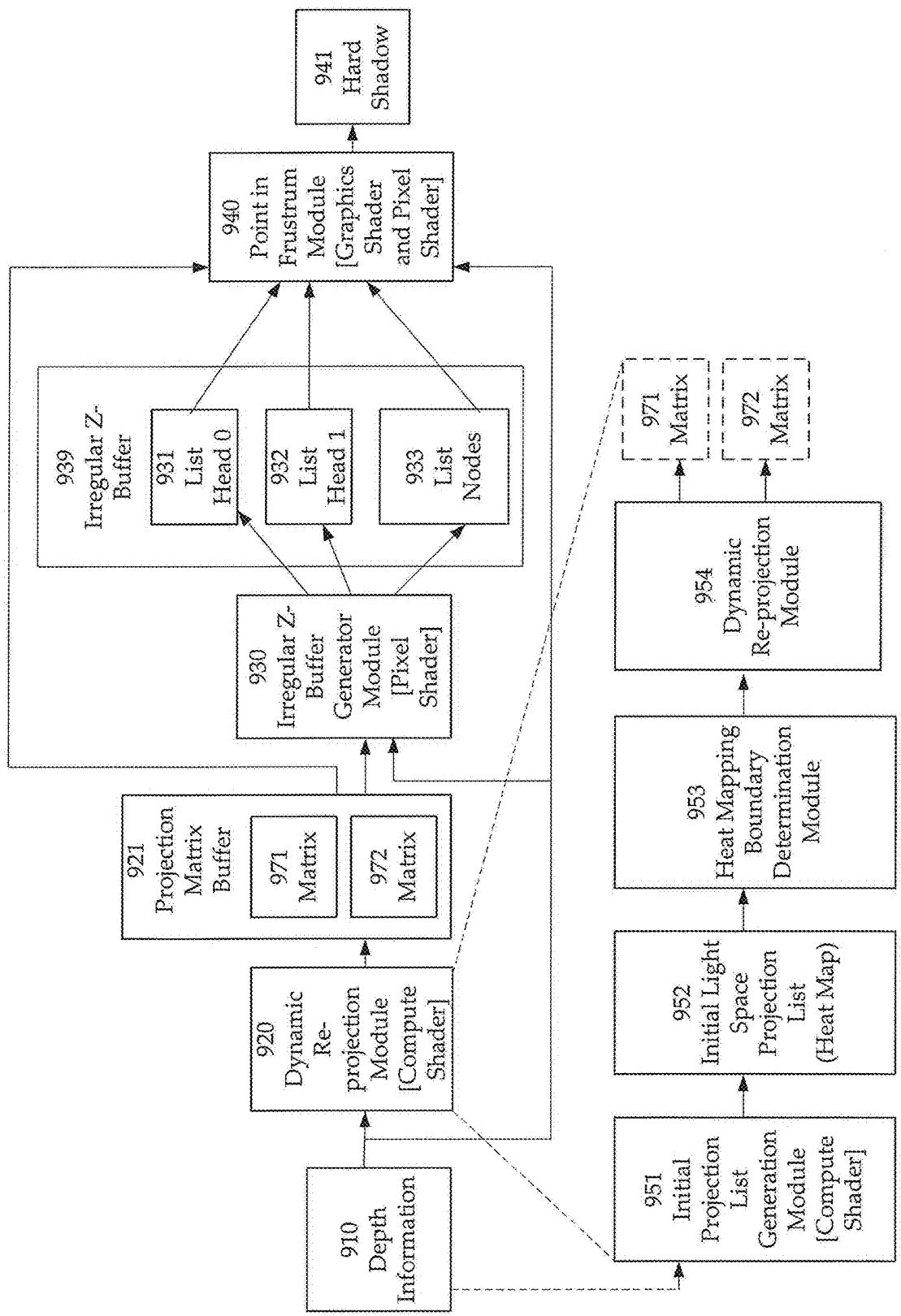
FIG. 9 is a block diagram of an exemplary operations pipeline for creating a hard shadow in accordance with one embodiment.

FIG. 9 is a block diagram of an exemplary operations pipeline 900 for creating a hard shadow in accordance with one embodiment. Depth information 910 is fed into dynamic re-projection module 920. In one embodiment, the depth information 910 is similar to depth information generated in block 110 of FIG. 1. Dynamic re-projection module 920 performs dynamic re-projection to produce projection matrix buffer 921. In one embodiment, the dynamic re-projection in FIG. 4. The matrices generated by dynamic re-projection module 920 are included in projection matrix buffer 921. Projection matrix buffer 921 and depth information 910 are fed into irregular Z-buffer generator 930 which produces list head 931, list head 932 and list nodes 933 included in irregular z-buffer 939. Depth information 910 and information from projection matrix buffer 921 and irregular z-buffer 939 are fed into point in frustum module 940 which produces hard shadow 941.

FIG. 9 also includes an exemplary pipeline for dynamic re-projection in accordance with one embodiment. In one embodiment, dynamic re-projection operations are performed by dynamic re-projection module 920. The dynamic re-projection operations can be performed in a compute shader. Depth information 910 is fed initial projection list generation module 1020 which generates initial list space projection list 952. Heat mapping boundary determination module 953 identifies heat boundaries. Dynamic re-projection module 954 performs dynamic re-projection of identified hot spots and outputs matrix 971 and matrix 972. Matrix 971 information and matrix 972 information are fed into projection matrix buffer 921.

Figure 10:
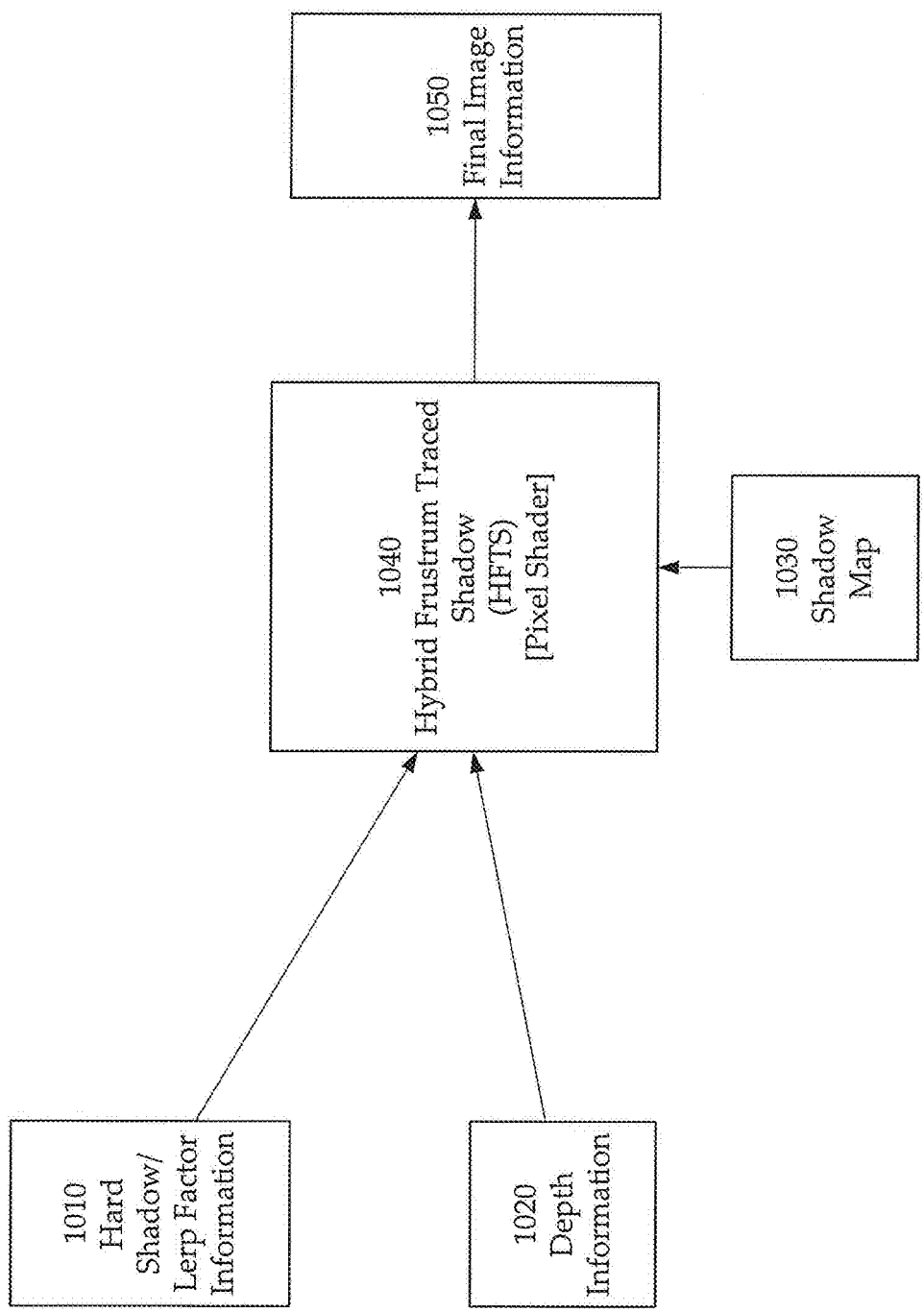
FIG. 10 is a block diagram of exemplary pipeline operations for final image rendering utilizing a hybrid frustum traced shadow in accordance with one embodiment.

The hard shadow 941 can be utilized to produce a final image. In one embodiment, a hybrid frustum traced shadow process is utilized to produce the final image. FIG. 10 is a block diagram of exemplary pipeline operations for final image rendering utilizing a hybrid frustum traced shadow in accordance with one embodiment. In one embodiment, exemplary pipeline operations 1000 are performed in a pixel shader. Hard Shadow/Leap Factor information 1010, depth information 1020, and shadow map 1030 are fed into hybrid frustum traced shadow module 1040 which produces final image information 1050. In one embodiment, depth information 1020 the same as depth information 910 and Hard Shadow/Leap Factor information 1010 include information based upon hard shadow 941 information.

In one embodiment, a hybrid frustum trace shadow approach includes a dynamic re-projection shadow mapping (DRSM) process in conjunction with a frustum trace light space visibility buffer approach to generate a hard shadow. The light space visibility buffer can be a an irregular Z buffer In one exemplary implementation, the hard shadow can then be interpolated with a soft shadow.

Figure 12:
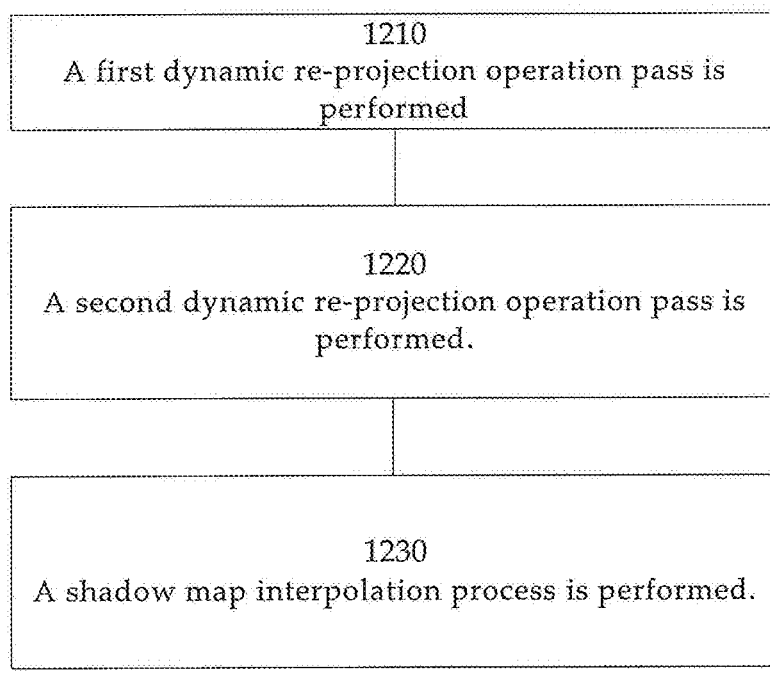
FIG. 12 is a block diagram of a hybrid frustum trace process in accordance with one embodiment.

FIG. 12 is a block diagram of a hybrid frustum trace process in accordance with one embodiment. In one embodiment, a hybrid frustum trace dynamic re-projection shadow map process includes two computer shader passes before frustum trace irregular Z buffer operations are performed.

In block 1210 a first dynamic re-projection operation pass is performed. The first process pass can include a screen space pass which performs a quantized count of screen pixels mapped to a light pixel or texel. The light first pass quantized count can be based upon an original cascade set up. The results of the quantized count can be included in a list.

In one embodiment, the first pass samples from a depth buffer transforming each value into a light space texel. It performs an atomic add for each texel that it maps to. That is what produces initial projection or heat map. The first pass can store the results out to a GPU side buffer. In one embodiment, the initial projection or heat map is output from the first compute shader pass in which how many pixels from a screen space map to each light space texel are counted.

In block 1220, a second dynamic re-projection operation pass is performed. The second process pass can include a light space pass that identifies areas with particular characteristics (e.g., non-zero list length, high list length, list length that exceeds a threshold, etc.). The particular characteristics can be based upon a user defined tolerance. The identified areas can be turned into new light space frusta. Matrices associated with the new light space frusta can be stored in a GPU side buffer along with the number of new re-projections.

In one embodiment, the second pass includes checking a counted value in the initial projection list or heat map to see if it exceeds a tolerance. If the tolerance or threshold is exceeded, the threshold the address from the textureor texel is added to a two-dimensional axis aligned bounding box. In one exemplary implementation, the check is performed for each texel in a heat map. The texels that exceed the theshold are included in a subset or sub-group. The compute shader can determine a minimum and maxium that exceed the list length as part of the boundary box determination and spreading out. This can be utilized to produce a two dimensional bounding box and then using that bounding box a new re-projection matrix is crated. In one embodiment, this includes the original frustum bounds X, Y and Z and figuring out the sub area inside that texture that the frustum maps to.

In one embodiment, during a frustum tracing pass a graphics shader un-projects the incoming SV_POSITION, and produced multiple primitives which are re-projected based upon matrices associated with the new light space frusta. The re-projection can also be based upon information stored in a GPU side buffer. In one exemplary implementation, this has the effect of removing most redundant light space. Since the new re-projections are subsets of the original, when they are mapped to the same resolution light space, it has the effect of spreading long lists over a wide area, which can dramatically improve the occupancy of the machine.

In one embodiment, building a projection matrix includes passing in the bounds of a frustum (e.g., the left, right, top, bottom, near, and far information, etc.). In one exemplary implementation, the bounds can be utilized by a standard library function to build a frustum. In one embodiment, bounds are passed to a compute shader as constants for the original frustum bounds. Based on the 2D bounding box that was found inside that texture new frustum bounds can be determined. The new frustum bounds can be associated with a re-projection subset because it is a sub set the original fustrum. After a second pass in which the dimensions of the bounding box are determined, the dimensions are applied to the original frustum and used to determine the new boundaries of the new frustum based on that. Two projection matrixes are written out to a small buffer that is stored on the GPU. Again, one of these matrices can be similar to the original projection matrix that was used. Additional matrices can be a cut out subset of the original one.

In one embodiment, information related to an initial projection is received from an application (e.g., gaming application, video post processing, etc.). In one exemplary implementation, the application is a gaming application. The re-projection matrix information is unprojected. In one embodiment, incoming position information is unprojected. The incoming position information can come from vertex shader. In one exemplary implementation, incoming SV-POSITION information is unprojected. In one embodiment, the projection matrix is unprojected by multiplying it by an inverse of the projection matrix. In one embodiment the computation is performed by the geometry matrix. In one exemplary implementation, multiple primitives are produced. Re-projection matrix information is retrieved from the projection matrixes and the positions are multiplied by the new or re-projection matrices.

Unlike a sample distribution sample map (SDSM), in one embodiment, the hybrid frustum trace shadow process does not require a CPU read back. The originally supplied light space can be used by the frustum and occlusion culling systems, which makes for very easy integration with existing applications and technology.

In block 1230, a shadow map interpolation process is performed. In one embodiment, linear interpolation between a hard shadow map and a soft shadow map is performed. In one embodiment, efficient shadow blocker distance accommodation operations are performed. In one exemplary implementation, a hybrid frustum traced shadow image rendering process includes a mechanism to account for affects or impacts on a shadow associated with the distance between a shadow blocker object and a shadow receive object. In one embodiment, a hybrid frustum traced shadow image rendering process approximates the eye view space position of a primitive in the graphics shader. A delta between the approximate triangle position and a screen position being tested is computed in the pixel shader, and an interlocked Min operation is performed to store out the minimum blocker distance to a full screen buffer.

Figure 11:
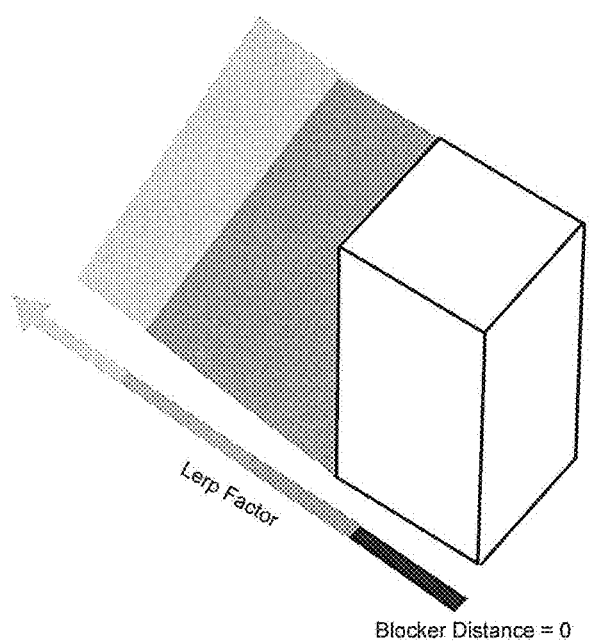
FIG. 11 is a block diagram illustrating hard shadow and soft shadow interpolation in accordance with one embodiment.

Hybrid frustum trace approaches can also include utilization of an interpolation factor between hard and soft shadows In one embodiment, a hybrid shadow is based upon lerp factors applied to a frustum traced hard shadow and a soft shadow. In one embodiment, the hybrid frustum trace shadow is a lerp function of the frustum traced hard shadow (FT), a PCSS soft shadow (PCSS), and a lerp factor (L). In one exemplary implementation, the frustum traced hard shadow can be expressed as HFTS=lerp(FT, PCSS, L). The lerp factor (L) is a stature function of the blocker distance (BD) divided by the product of the world space scale (WSS) multiplied by a percentage of the hard shadow (PHS). In one exemplary implementation, the lerp factor can be expresses as L=saturate (BD/WSS*PHS). FIG. 11 is a block diagram illustrating hard shadow and soft shadow interpolation.

Figure 14:
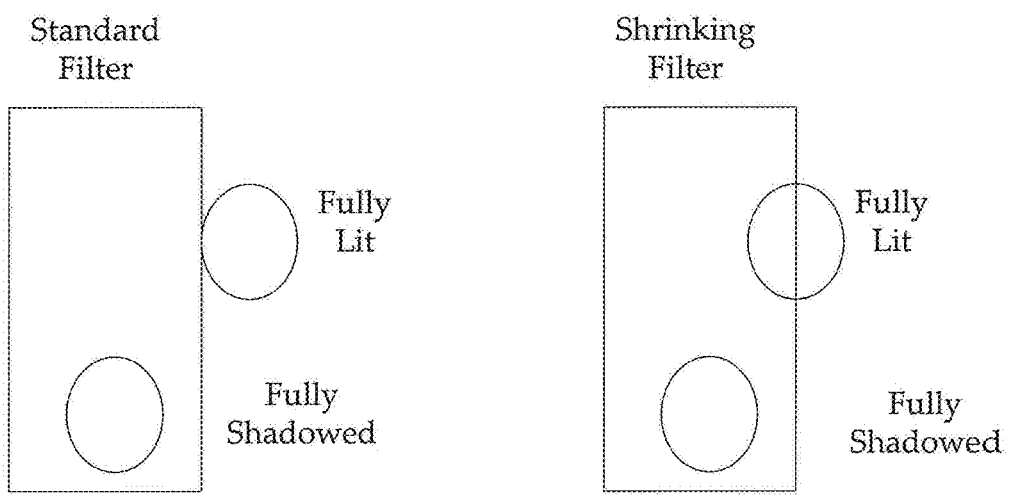
FIG. 14 is a block diagram illustrating shifted penumbra interpolation in accordance with one embodiment.

In one embodiment, a shifted penumbra interpolation is utilized. In one exemplary implementation, a hybrid frustum trace process shifts filter results inward and defines a level of penumbra shift at both ends of a spectrum. In one embodiment, the point or threshold at which a sample being tested is considered fully lit is shifted. A ratio of a filter can be shifted to determine what is considered fully lit. Shinking the shadow map inward can pull in or reduce sawtooth effects at contact points. In one embodiment, an interpolation factor is used to interpolate between a shrinking filter near the contact point up to a standard filter where the shadow is more soft. In one exemplary implementation, shrinking does not occur across all the shadow but rather occurs relatively close to the contact points. FIG. 14 is a block diagram illustrating shifted penumbra interpolation in accordance with one embodiment.

In one embodiment, both front and backfacing primitives are tested. In one exemplary implementation, the front and backfacing primitives are tested at no extra cost. The front and backfacing primitives testing can be utilized in applications that use single layer thick geometry to represent objects.

Figure 13:
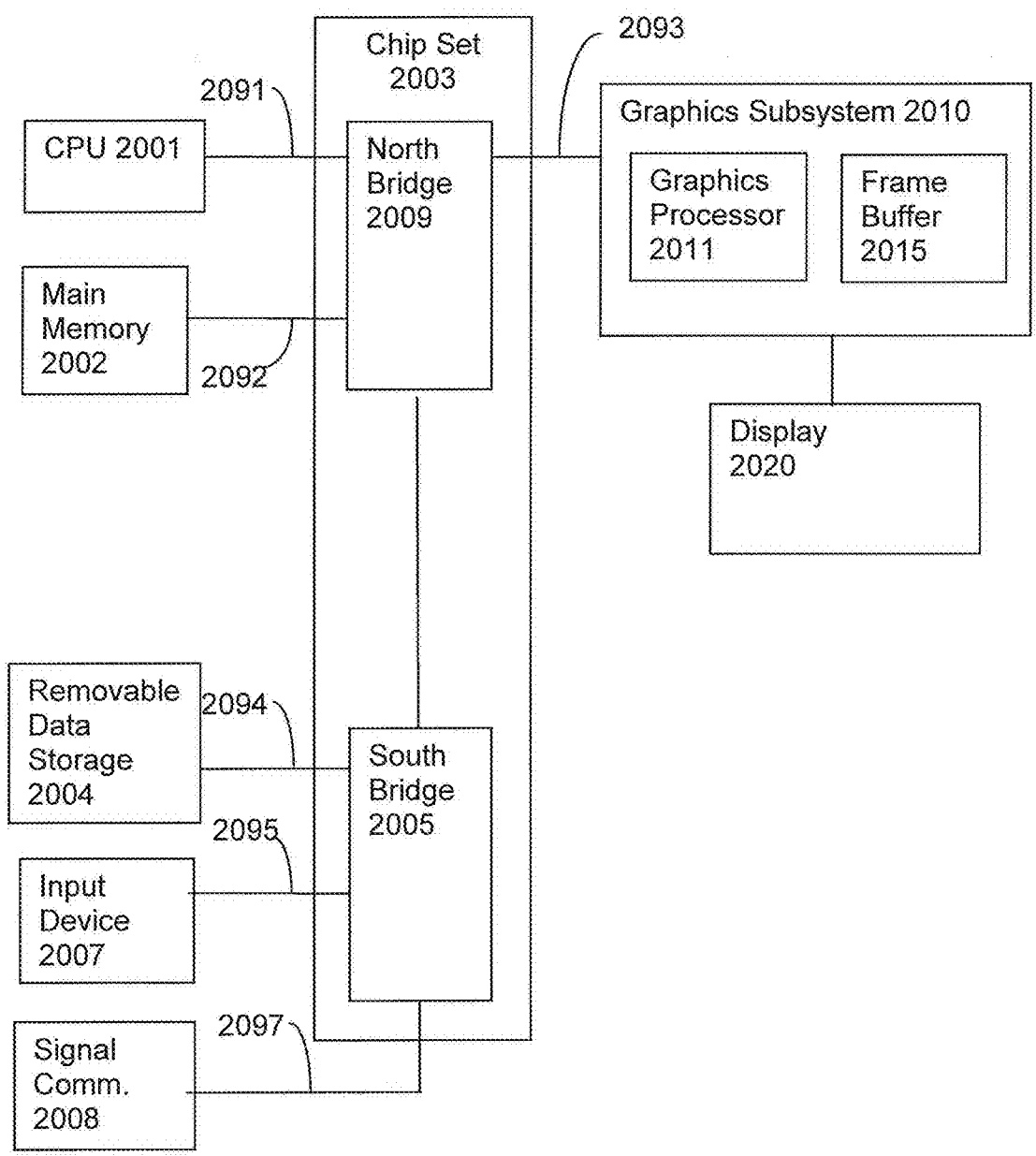
FIG. 13 is a block diagram of a computer system upon which embodiments of the present invention can be implemented in accordance with one embodiment.

With reference to FIG. 13, a block diagram of an exemplary computer system 2000 is shown, one embodiment of a computer system upon which embodiments of the present invention can be implemented. Computer system 2000 includes central processor unit (CPU) 2001, main memory 2002 (e.g., random access memory), chip set 2003 with north bridge 2009 and south bridge 2005, removable data storage device 2004, input device 2007, signal communications port 2008, and graphics subsystem 2010 which is coupled to display 2020. Computer system 2000 includes several busses for communicatively coupling the components of computer system 2000. Communication bus 2091 (e.g., a front side bus) couples north bridge 2009 of chipset 2003 to central processor unit 2001. Communication bus 2092 (e.g., a main memory bus) couples north bridge 2009 of chipset 2003 to main memory 2002. Communication bus 2093 (e.g., the Advanced Graphics Port interface, Peripheral Component Interconnect (PCI) Express bus, etc.) couples north bridge of chipset 2003 to graphic subsystem 2010. Communication buses 2094, 2095 and 2097 (e.g., a PCIe bus, etc.) couples south bridge 2005 of chip set 2003 to removable data storage device 2004, input device 2007, signal communications port 2008 respectively. Graphics subsystem 2010 includes graphics processor unit (GPU) 2011 and Graphics Memory 2015.

The components of computer system 2000 cooperatively operate to provide versatile functionality and performance. In one exemplary implementation, the components of computer system 2000 cooperatively operate to provide predetermined types of functionality.

Communications bus 2091, 2092, 2093, 2094, 2095 and 2097 communicate information. Central processor 2001 processes information. Main memory 2002 stores information and instructions for the central processor 2001. Removable data storage device 2004 also stores information and instructions (e.g., functioning as a large information reservoir). Input device 2007 provides a mechanism for inputting information and/or for pointing to or highlighting information on display 2020. Signal communication port 2008 provides a communication interface to exterior devices (e.g., an interface with a network). Display device 2020 displays information in accordance with data stored in frame buffer 2015. Graphics processor 2011 processes graphics commands from central processor 2001 and provides the resulting data to graphics memory 2015 for storage and retrieval by display monitor 2020. Graphics memory 2015 can include storage for various memory operations (e.g., CPU cache operations, frame buffer operations, raster operations, rendering operations, etc.). Hybrid frustum trace processes can be utilized for various operations within computer system 2000 (e.g., for execution operations on CPU 2001, execution operations on GPU 2011, etc.).

Unlike approaches that can lead to large area as a screen mapping to a relatively small number of light space pixels. For example, conventional attempts (e.g., sample distribution sample map (SDSM), etc.) at generating high cascades can lead to large area of a screen mapping to a handful of light space pixels This can lead to significant detrimental impacts or spikes in performance, including very poor occupancy. Again, the present hybrid frustum trace approach with dynamic re-projection can improve hardware resource occupancy and performance. The hybrid frustum trace approach with dynamic re-projection can also offer improvement over other frustum trace attempts that may involve larger area of a screen mapping to a relatively small number of light space pixels.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claim.

What is claimed:

1. An integrated circuit implemented system for generating a hard shadow, the system comprising:
a compute shader configured to retrieve pixel depth information from a memory and to generate projection matrix information therefrom,
wherein the compute shader is configured to generate said projection matrix information by performing dynamic re-projection from an eye-space to a light space utilizing the pixel depth information,
wherein the dynamic re-projection includes:
a first screen space pass which performs a quantized count of screen pixels mapped to a light pixel and said quantized count is included in a list, and
a second screen space pass that utilizes the list to selectively identify sub-areas with particular screen pixel counts per light pixel that correspond to a threshold,
wherein the selectively identified sub-areas are subsequently turned into new light space frusta which are associated with a new projection matrix.

2. The system of claim 1, wherein the light space visibility information comprises irregular z information and is stored in an irregular z-buffer.

3. The system of claim 1, wherein the performing dynamic re-projection comprises creating multiple projection matrices based on density of pixel projections in an area of a light space grid.

4. The system of claim 1, wherein a first projection matrix comprises a subset of a portion of initial projection information and wherein the subset further corresponds to a portion of a light space grid where a density of pixel projections exceeds a predetermined threshold.

5. The system of claim 1, wherein the light space visibility information comprises list head information.

6. The system of claim 1, wherein the performing frustum trace operations comprises determining if a pixel is within a frustum.

7. The system of claim 1, wherein the performing frustum trace operations comprises:
defining a frustum projected from a grid cell corresponding to a light source in light space;
determining that a graphics primitive intersects the frustum; and
accessing a light space visibility buffer to obtain a set of pixel fragment footprints corresponding to the frustum and identifying whether a pixel fragment footprint within the set of pixel fragment footprints is shadowed by the graphics primitive.

8. The system of claim 1, further comprising:
a pixel shader configured to generate light space visibility information; and
a graphics shader configured to perform frustum trace operations to generate hard shadow information, wherein the frustum trace operations utilize the light space visibility information.

9. A computer implemented method of performing dynamic re-projection, the method comprising:
generating an initial projection list;
determining a subset of light space grid cells in which the initial projection list indicates that a number of pixels that are collectively mapped to the subset of light space grid cells exceeds a predetermined threshold; and
performing dynamic re-projection of a subset of the pixels corresponding to the subset of light space grid cells, the dynamic re-projection generating a re-projection list that corresponds to the subset of the pixels spread out across a wider light space area than in the initial projection list.

10. The method of dynamic re-projection of claim 9, wherein said performing dynamic re-projection comprises spreading out the subset of pixels to a light space grid with a same number of light space grid cells as an initial light space grid.

11. The method of dynamic re-projection of claim 9, further comprising generating a plurality of matrices based upon the dynamic re-projection.

12. The method of dynamic re-projection of claim 9, further comprising generating a plurality of matrices based upon results from the dynamic re-projection.

13. The method of dynamic re-projection of claim 12, wherein the plurality of matrices comprises:
a first matrix corresponding to a projection of an original set of pixels minus the subset of pixels; and
a second matrix corresponding to the dynamic re-projection of the subset of pixels.

14. The method of dynamic re-projection of claim 12, further comprising creating a projection matrix buffer operable to store in memory multiple projection matrices associated with the dynamic re-projection.

15. The method of dynamic re-projection of claim 9, wherein the subset of pixels corresponds to a hot area with respect to a number of pixels mapping to an area of a light space grid.

16. The method of dynamic re-projection of claim 9, wherein the performing dynamic re-projection results in a number of pixels projected to a light space grid being quadratically reduced which reduces a length of a list corresponding to a projection of the pixels.

17. An electronic system comprising:
a processor configured to perform operations comprising hybrid frustum trace shadow operations to generate results comprising a shadow effect, wherein the hybrid frustum trace shadow operations comprise:
dynamic re-projection operations responsive to a number of screen pixels mapped to a light pixel exceeding a threshold, wherein the dynamic re-projection operations include creating a re-projection matrix by applying a subset of an original projection matrix to a similar height and width texture grid in light space as an original texture grid and spreading out pixels of the subset to a wider area than in the original projection matrix; and
frustum tracing operations;
a memory configured to store information for the processor, wherein the information comprises information associated with hybrid frustum trace shadow operations; and
a display configured to render shadows in accordance with the shadow effect.

18. The electronic system as described in claim 17, wherein the processor is further operable to render anti-aliased hard shadows in real-time using a light space visibility buffer generated utilizing the results.

19. The electronic system as described in claim 18, wherein the processor is further operable to avoid introduction of spatial and temporal aliasing operations.

20. The electronic system as described in claim 18, wherein said buffer is stored in said memory.

21. The electronic system as described in claim 17, wherein a lerp factor is applied to the frustum tracing operations for generation of hard shadow information.

\* \* \* \* \*